United States Patent
Manolakos et al.

(10) Patent No.: US 11,963,202 B2
(45) Date of Patent: Apr. 16, 2024

(54) UE RECEIVE-TRANSMIT TIME DIFFERENCE MEASUREMENT REPORTING

(71) Applicant: QUALCOMM Incorporated, San Diego, CA (US)

(72) Inventors: Alexandros Manolakos, Escondido, CA (US); Tingfang Ji, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/233,476

(22) Filed: Apr. 17, 2021

(65) Prior Publication Data
US 2021/0337531 A1 Oct. 28, 2021

Related U.S. Application Data

(60) Provisional application No. 63/025,058, filed on May 14, 2020, provisional application No. 63/014,626, filed on Apr. 23, 2020.

(51) Int. Cl.
*H04W 72/50* (2023.01)
*H04B 17/27* (2015.01)
(Continued)

(52) U.S. Cl.
CPC ............ *H04W 72/51* (2023.01); *H04B 17/27* (2015.01); *H04L 5/0051* (2013.01); *H04W 64/00* (2013.01); *H04W 72/044* (2013.01); *H04W 72/21* (2023.01)

(58) Field of Classification Search
None
See application file for complete search history.

(56) References Cited

U.S. PATENT DOCUMENTS 9,482,742 B1 * 11/2016 Fischer ................... H04B 7/04
2016/0337805 A1 * 11/2016 Liao ....................... H04W 8/005
(Continued)

OTHER PUBLICATIONS

"3rd Generation Partnership Project, Technical Specification Group Radio Access Network, LTE Positioning Protocol LPP) (Release 16)", 3GPP Standard, Technical Specification, 3GPP TS 37.355, 3rd Generation Partnership Project (3GPP), Mobile Competence Centre, 650, Route Des Lucioles, F-06921 Sophia-Antipolis Cedex, France, No. V16.0.0, Apr. 13, 2020 (Apr. 13, 2020), pp. 1-281, XP051893977, Retrieved from the Internet: URL: ftp://ftp.3gpp.org/Specs/archive/37_series/37.355/37355-900.zip. 37355-g00.docx [retrieved on Apr. 13, 2020] section 6.5.3.2 section 6.5.12.4.
(Continued)

*Primary Examiner* — Brandon M Renner
(74) *Attorney, Agent, or Firm* — Thien T. Nguyen

(57) ABSTRACT

A positioning method includes: measuring, at a UE, an IB PRS resource on a first frequency band; transmitting, from the UE to a recipient device, an OB PRS resource on a second frequency band; and at least one of: transmitting, from the UE based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmitting, from the UE based on the second frequency band being implicit, the receive-transmit time difference indication without transmitting the band indication.

32 Claims, 12 Drawing Sheets

(51) Int. Cl.
| | | |
|---|---|---|
| *H04L 5/00* | (2006.01) | |
| *H04W 64/00* | (2009.01) | |
| *H04W 72/044* | (2023.01) | |
| *H04W 72/21* | (2023.01) | |
| *H04W 72/51* | (2023.01) | |

(56) References Cited

U.S. PATENT DOCUMENTS

| | | | | |
|---|---|---|---|---|
| 2018/0295594 | A1* | 10/2018 | Huang | H04W 24/10 |
| 2018/0343132 | A1* | 11/2018 | Maheshwari | H04L 12/16 |
| 2021/0120581 | A1* | 4/2021 | Kim | H04W 72/23 |
| 2021/0385896 | A1* | 12/2021 | Kim | H04W 36/0027 |
| 2022/0393820 | A1* | 12/2022 | Keating | H04W 76/14 |

OTHER PUBLICATIONS

International Search Report and Written Opinion—PCT/US2021/027856—ISA/EPO—dated Jun. 29, 2021.

Keating R., et al., "Overview of Positioning in 5G New Radio", 2019 16th International Symposium on Wireless Communication Systems (ISWCS), IEEE, Aug. 27, 2019 (Aug. 27, 2019), pp. 320-324. XP033636268, DOI: 10.1109/ISWCS.2019.8877160 [retrieved on Oct. 18, 2019] p. 323-p. 324.

Qualcomm Incorporated: "On UE RX-Tx Timing Difference Measurements in NR Positioning", 3GPP Draft, 3GPP TSG-RAN WG4 Meeting #94-e-Bis, R4-2003569, 3rd Generation Partnership Project (3GPP), Mobile Competence Centre, 650, Route Des Lucioles, F-06921 Sophia-Antipolis Cedex, France, vol. RAN WG4, No. Online Meeting, Apr. 20, 2020-Apr. 30, 2020, Apr. 10, 2020 (Apr. 10, 2020), XP051875000, 13 Pages, Retrieved from the Internet: URL: https://ftp.3gpp.org/tsg_ran/WG4_Radio/TSGR4_94_eBis/Docs/R4-2003569.zip. R4-2003569—On UE Rx-Tx timing difference measurements in NR positioning.docx [retrieved on Apr. 10, 2020] section 2 section 3, sub-section Multi-RTT section 5.

* cited by examiner

| Band index | Frequency band |
|---|---|
| 000 | Band1 (14) |
| 001 | Band2 (123) |
| 010 | Band3 (178) |
| 011 | Band4 (212) |
| 100 | Band5 (564) |
| 101 | Band6 (785) |
| 110 | Band7 (901) |
| 111 | Band8 (977) |

FIG. 18

UE RECEIVE-TRANSMIT TIME DIFFERENCE MEASUREMENT REPORTING

CROSS-REFERENCE TO RELATED APPLICATIONS

This application claims the benefit of U.S. Provisional Application No. 63/014,626, filed Apr. 23, 2020, entitled "INTER-FREQUENCY UE RECEIVE-TRANSMIT TIME DIFFERENCE MEASUREMENT," and claims the benefit of U.S. Provisional Application No. 63/025,058, filed May 14, 2020, entitled "UE RECEIVE-TRANSMIT TIME DIFFERENCE MEASUREMENT REPORTING," both of which are assigned to the assignee hereof and are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example UE (user equipment) includes: at least one transceiver; a memory; and at least one processor, communicatively coupled to the at least one transceiver and the memory, where the at least one processor is: configured to measure an inbound (IB) positioning reference signal (PRS) resource, on a first frequency band, received via the at least one transceiver; configured to transmit, via the at least one transceiver to a recipient device, an outbound (OB) PRS resource on a second frequency band; and at least one of: configured to transmit, via the at least one transceiver and based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or configured to transmit, based on the second frequency band being implicit, the receive-transmit time difference indication via the at least one transceiver without the band indication.

Another example UE includes: means for measuring an IB PRS resource on a first frequency band; means for transmitting, to a recipient device, an OB PRS resource on a second frequency band; and at least one of: means for transmitting, based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or means for transmitting, based on the second frequency band being implicit, the receive-transmit time difference indication without the band indication.

An example positioning method includes: measuring, at a UE, an IB PRS resource on a first frequency band; transmitting, from the UE to a recipient device, an OB PRS resource on a second frequency band; and at least one of: transmitting, from the UE based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmitting, from the UE based on the second frequency band being implicit, the receive-transmit time difference indication without transmitting the band indication.

An example non-transitory, processor-readable storage medium includes processor-readable instructions to cause one or more processors of a UE to: measure an IB PRS resource on a first frequency band; transmit, to a recipient device, an OB PRS resource on a second frequency band; and at least one of: transmit, based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmit, based on the second frequency band being implicit, the receive-transmit time difference indication without the band indication.

BRIEF DESCRIPTION OF THE DRAWINGS

FIG. 18 is a diagram of a capability report indicating frequency bands and corresponding relative band indexes.

DETAILED DESCRIPTION

Figure 1:
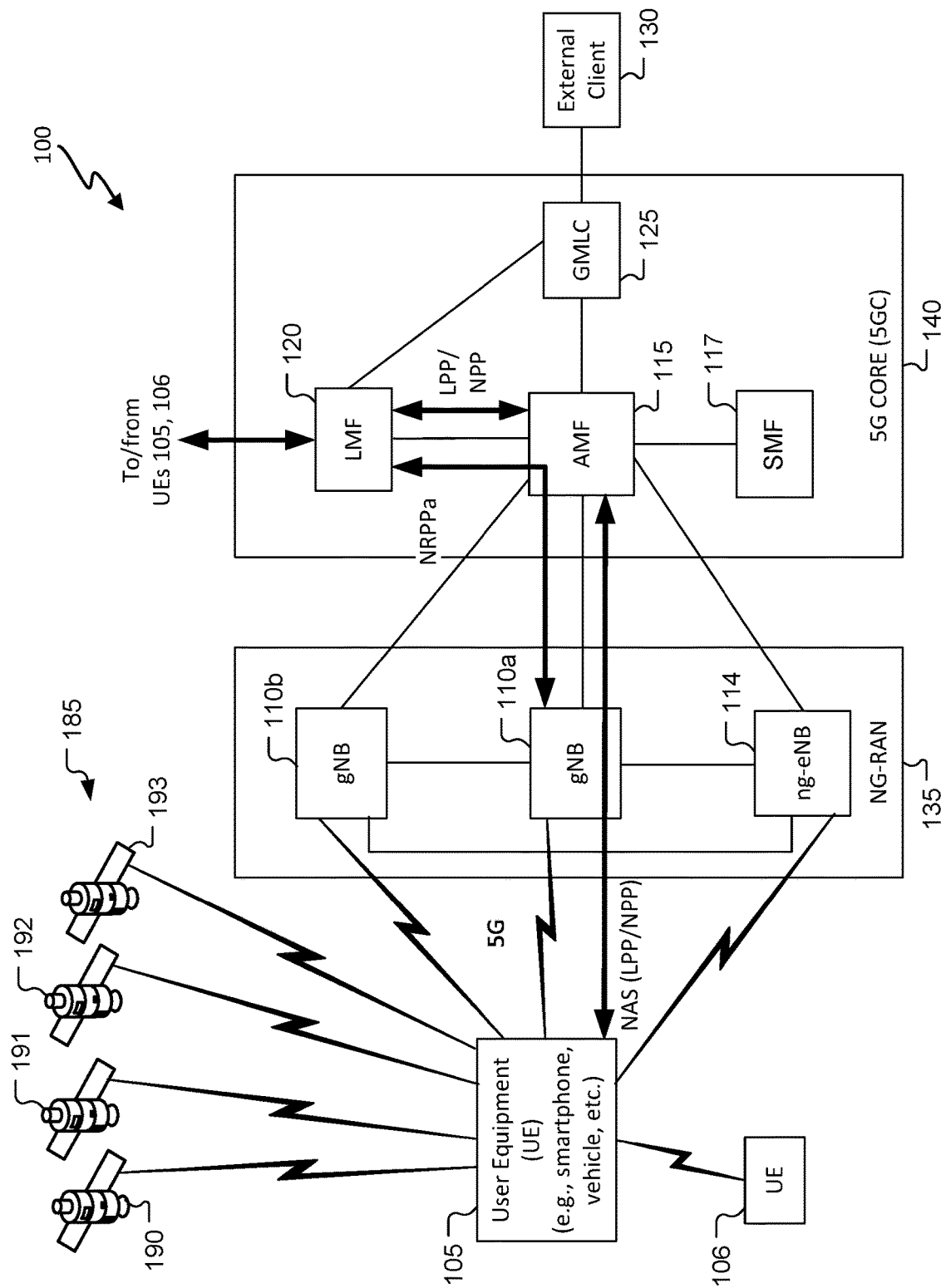
FIG. 1 is a diagram of an example wireless communications system.

Techniques are discussed herein for reporting time differences between arrival of IB PRS (inbound positioning reference signal(s)) received at a UE (user equipment) and transmission of OB PRS (outbound PRS) from the UE corresponding to the IB PRS. Inbound PRS may be, for example, DL PRS (downlink PRS) or SL PRS (sidelink PRS) and outbound PRS may be, for example, UL PRS (uplink PRS) or SL PRS. A band indication indicating a band of the OB PRS and/or a band of the IB PRS may be reported in association with a time difference between reception of the IB PRS and transmission of the OB PRS. The band indication may not be transmitted if the band(s) is(are) implicit, e.g., with only one IB PRS band and only one OB PRS band being configured (at least for a type of the OB PRS (e.g., UL PRS or SL PRS)), or with a band combination for IB PRS and OB PRS being reported by the UE and/or configured for the UE, or with the OB PRS band being the same as the IB PRS band if available (e.g., scheduled). A band indication may be a relative band index indicating which of possible bands reported by or configured (e.g., scheduled) for the UE was used for the IB PRS and/or the OB PRS corresponding to a reported time difference. These are examples, and other examples may be implemented.

Items and/or techniques described herein may provide one or more of the following capabilities, as well as other capabilities not mentioned. PRS processing overhead may be reduced, e.g., by providing an indication of, or from which may be determined, the IB PRS frequency band and/or the OB PRS frequency band of IB PRS and/or OB PRS, respectively, corresponding to a time difference between IB PRS arrival and corresponding OB PRS transmission. Signaling overhead may be kept low, e.g., by designating frequency bands using relative band indexes. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least sometimes using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples only as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
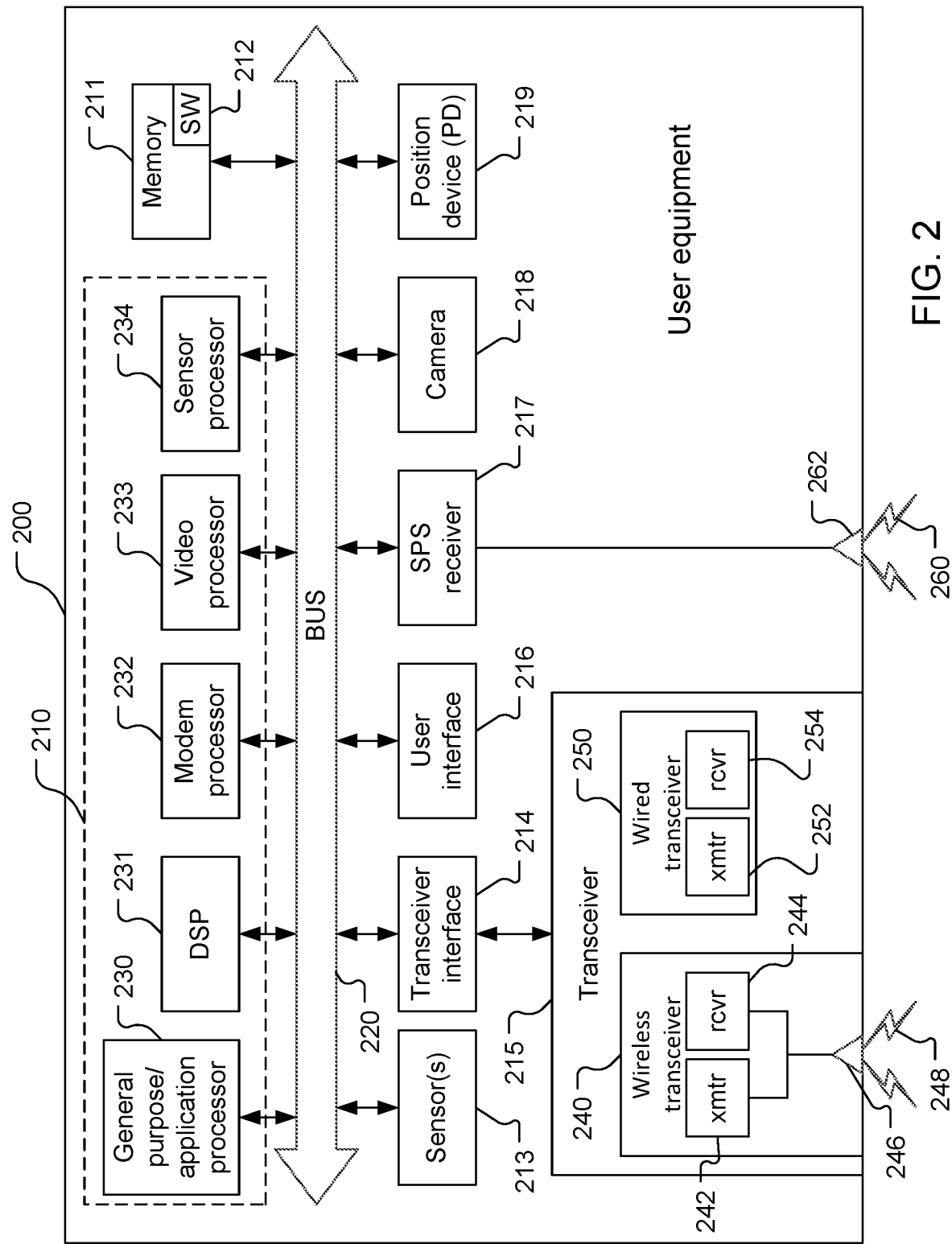
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more cellular wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/ IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/ integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/ integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
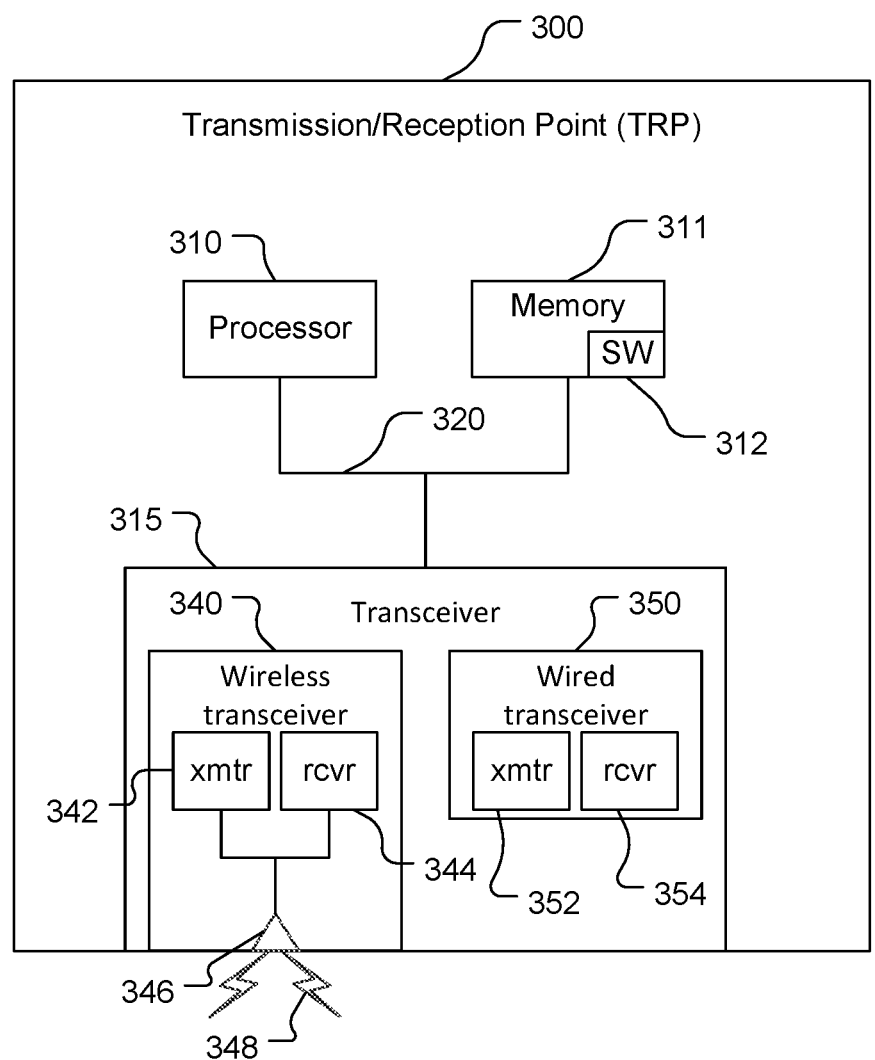
FIG. 3 is a block diagram of components of an example transmission/reception point shown in FIG. 1.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
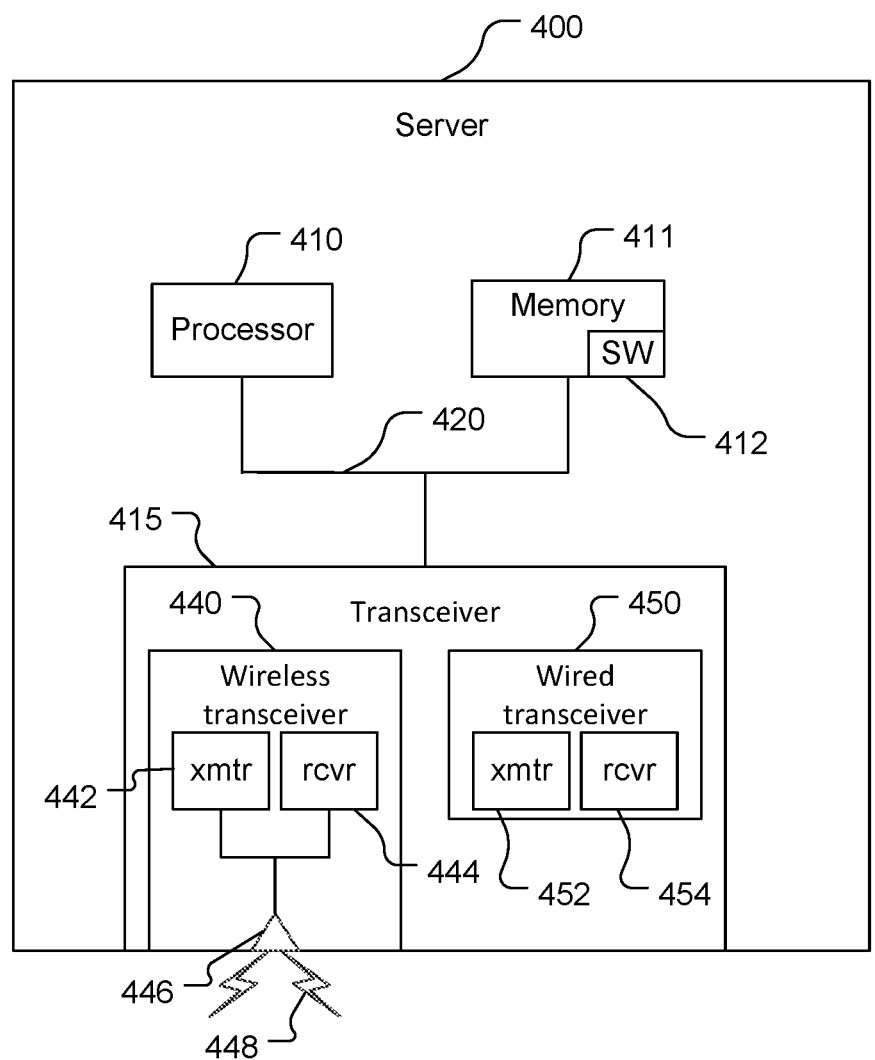
FIG. 4 is a block diagram of components of an example server shown in FIG. 1.

Referring also to FIG. 4, a server 400, which is an example of the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer only to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

Positioning Techniques

For terrestrial positioning of a UE in cellular networks, techniques such as Advanced Forward Link Trilateration (AFLT) and Observed Time Difference Of Arrival (OTDOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive subcarriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

$UE_{Rx-Tx}$ Time Difference Measurement and Reporting

Figure 6:
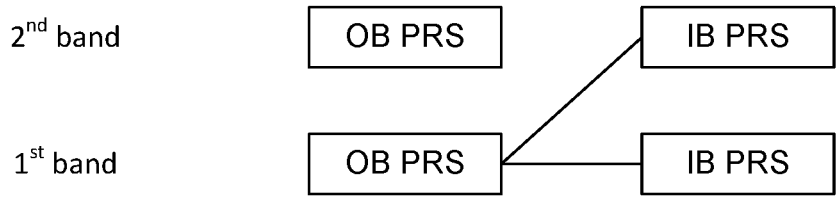
FIG. 6 is a block diagram of scheduled IB PRS (inbound positioning reference signal(s)) in first and second frequency bands and scheduled OB PRS (outbound positioning reference signal(s)) in the first frequency band, with IB PRS/OB PRS pairs in only the first frequency band or in a second frequency band/first frequency band combination used to determine $UE_{Rx-Tx}$.
Figure 7:
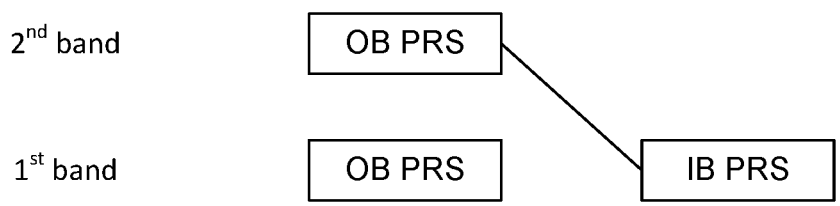
FIG. 7 is a block diagram of scheduled IB PRS in the first frequency band and OB PRS in the first and second frequency bands with IB PRS/OB PRS pairs in a first frequency band/second frequency band combination used to determine $UE_{Rx-Tx}$.
Figure 21:
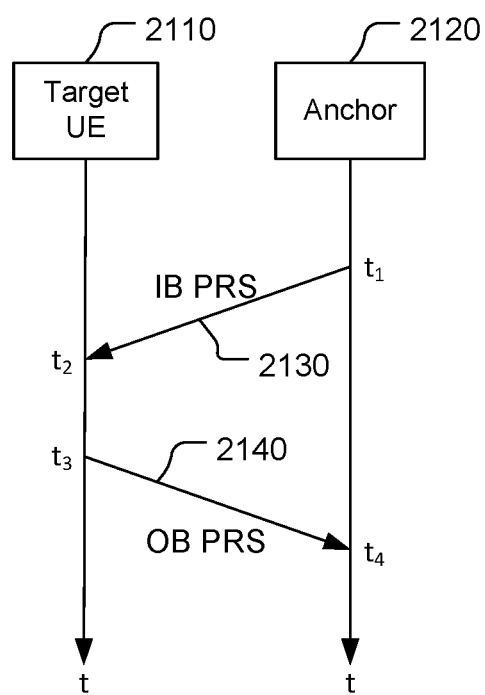
FIG. 21 is a block diagram of positioning reference signal exchange between an anchor and a target user equipment.

Referring to FIG. 21, inbound PRS 2130 (i.e., PRS received by a target UE 2110, e.g., from an anchor 2120) and outbound PRS 2140 (i.e., PRS transmitted by the target UE 2110, e.g., to the anchor 2120) for determining round-trip time may be transmitted in the same frequency band or different frequency bands with the different frequency bands being in the same frequency range or different frequency ranges. Traditionally, the IB PRS is configured by LPP and the OB PRS is configured by RRC (Radio Resource Control) signals, with no explicit pairing between IB PRS and OB PRS. The anchor 2120 (also called an anchor point) has a known location that can be used in combination with a range from the anchor to the target UE 2110 to help determine a location of the target UE 2110. The anchor point 2120 transmitting the IB PRS and receiving the OB PRS can determine a transmission time $t_1$ of the IB PRS and a reception time $t_4$ of the OB PRS, and determine an $Anchor_{Rx-Tx}$ time difference between transmission of the IB PRS and reception of the OB PRS. The target UE 2110 can determine and provide the $UE_{Rx-Tx}$ time difference between a reception time $t_2$ of the IB PRS and a transmission time $t_3$ of the OB PRS. The RTT between the anchor 2120 and the target UE 2110 can be determined by subtracting the $UE_{Rx-Tx}$ time difference from the $Anchor_{Rx-Tx}$ time difference. An anchor that transmits the IB PRS and receives the OB PRS may, for example, be a TRP (with the IB PRS being DL PRS and the OB PRS being UL PRS) or a UE (with the IB PRS and OB PRS both being SL PRS). To ensure that the RTT is correct, the $Anchor_{Rx-Tx}$ time difference corresponding to the $UE_{Rx-Tx}$ time difference (i.e., the $Anchor_{Rx-Tx}$ time difference determined for the same IB PRS and OB PRS as the $UE_{Rx-Tx}$ time difference) is used to determine the RTT. For example, FIG. 6 shows an inter-band CA (Carrier Aggregation) scenario where two CCs (Component Carriers) are configured with OB PRS each belonging to a different TAG (Timing Advance Group). Moreover, IB PRS is also configured in two positioning frequency layers where one belongs to the first band and another belongs to the second band. If the $UE_{Rx-Tx}$ time difference is reported without an indication of, or agreement to, or known relationship between, the IB PRS and the OB PRS for the $\text{UE}_{Rx\text{-}Tx}$ time difference, then a recipient of the time difference may not be able to use the time difference properly (to determine corresponding transmit and reception times at the anchor) to determine a round-trip time between an anchor (e.g., an entity, such as a TRP or UE, of known location) and a target UE (a UE whose location is to be determined). A similar result may occur where, as shown in FIG. 7, IB PRS is scheduled in a single positioning frequency layer that belongs to the first band and OB PRS is scheduled the first band and the second band, and the use of the first-band IB PRS and the second-band OB PRS for determining the $\text{UE}_{Rx\text{-}Tx}$ time difference is not known to a recipient of the time difference (e.g., if OB PRS in the second band is typically used for UL-only positioning).

Figure 5:
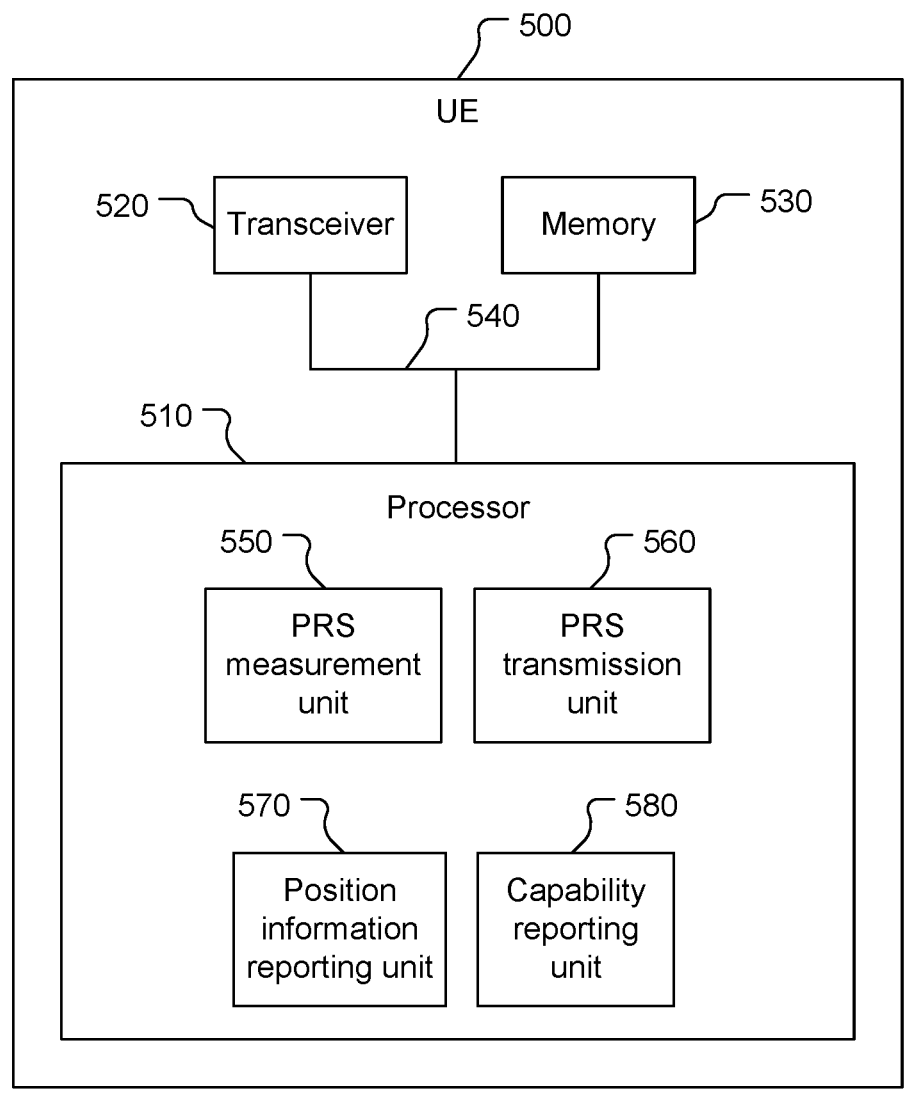
FIG. 5 is a block diagram of an example user equipment.

Referring to FIG. 5, with further reference to FIGS. 1-4, a UE 500 includes a processor 510, a transceiver 520, and a memory 530 communicatively coupled to each other by a bus 540. The UE 500 may include the components shown in FIG. 5, and may include one or more other components such as any of those shown in FIG. 2 such that the UE 200 may be an example of the UE 500. For example, the processor 510 may include one or more of the components of the processor 210. The transceiver 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 520 may include the wired transmitter 252 and/or the wired receiver 254. The memory 530 may be configured similarly to the memory 211, e.g., including software with processor-readable instructions configured to cause the processor 510 to perform functions.

The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the transceiver 520) may include a PRS measurement unit 550, a PRS transmission unit 560, a position information reporting unit 570, and a capability reporting unit 580. The PRS measurement unit 550, the PRS transmission unit 560, the position information reporting unit 570, and the capability reporting unit 580 are discussed further below, and the description may refer to the processor 510 generally, or the UE 500 generally, as performing any of the functions of the PRS measurement unit 550, the PRS transmission unit 560, the position information reporting unit 570, and the capability reporting unit 580.

The PRS measurement unit 550 is configured to measure IB PRS in various frequency bands and the PRS transmission unit 560 is configured to transmit OB PRS in various frequency bands. For example, the unit 550, 560 may be configured (e.g., during manufacture of the UE 500 by design) to measure and/or transmit PRS in frequency bands of FR1 (450 MHz-6 GHz (called the sub-6 GHz range)) and/or FR2 (24.25 GHz-52.6 GHz (called the millimeter-wave range)).

The position information reporting unit 570 is configured to determine the $\text{UE}_{Rx\text{-}Tx}$ time difference based on a measured IB PRS and a transmitted OB PRS, where the IB PRS and the OB PRS may be in difference frequency bands, and report the $\text{UE}_{Rx\text{-}Tx}$ time difference to a network entity (e.g., the TRP 300 and/or the server 400 (possibly via the TRP 300)). The position information reporting unit 570 may provide one or more explicit indications of the frequency band(s) of the PRS used to determine the $\text{UE}_{Rx\text{-}Tx}$ time difference. The position information reporting unit 570 may abstain from providing the explicit indication(s) based on the frequency band(s) of the PRS used to determine the $\text{UE}_{Rx\text{-}Tx}$ time difference being implicit, e.g., negotiated, a consequence of the scheduled PRS, or according to a protocol known by the UE and a device that determines an $\text{Anchor}_{Rx\text{-}Tx}$ time difference between a time of receipt of the OB PRS and a time of transmission of the IB PRS.

Figure 8:
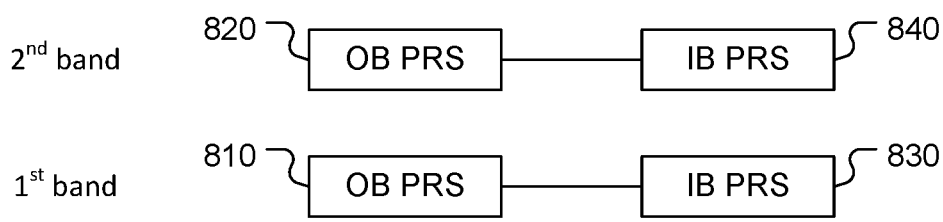
FIG. 8 is a block diagram of scheduled IB PRS in the first and second frequency bands and OB PRS in the first and second frequency bands, with IB PRS/OB PRS pairs in only the first frequency band or in only the second frequency band used to determine $UE_{Rx-Tx}$.
Figure 9:
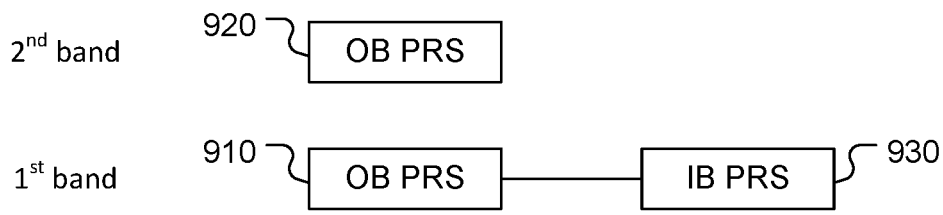
FIG. 9 is a block diagram of scheduled IB PRS in the first frequency band and OB PRS in the first and second frequency bands, with a IB PRS/OB PRS pair in only the first frequency band used to determine $UE_{Rx-Tx}$.
Figure 10:
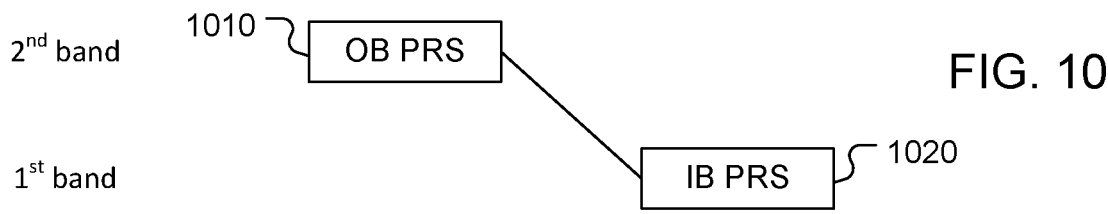
FIG. 10 is a block diagram of scheduled IB PRS in the first frequency band and OB PRS in the second frequency band, with a IB PRS/OB PRS pair in the first frequency band/second frequency band combination used to determine $UE_{Rx-Tx}$.
Figure 11:
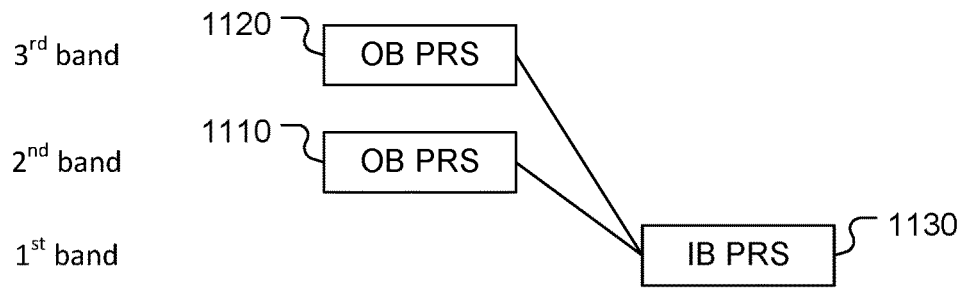
FIG. 11 is a block diagram of scheduled IB PRS in the first frequency band and OB PRS in the second frequency band and a third frequency band, with IB PRS/OB PRS pairs in the first frequency band/second frequency band combination or a first frequency band/third frequency band combination used to determine $UE_{Rx-Tx}$.
Figure 12:
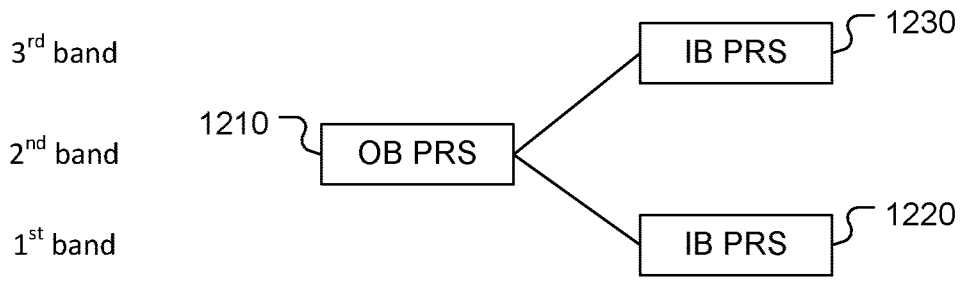
FIG. 12 is a block diagram of scheduled IB PRS in the first and third frequency bands and OB PRS in the second frequency band, with IB PRS/OB PRS pairs in the first frequency band/second frequency band combination or a third frequency band/second frequency band combination used to determine $UE_{Rx-Tx}$.
Figure 15:
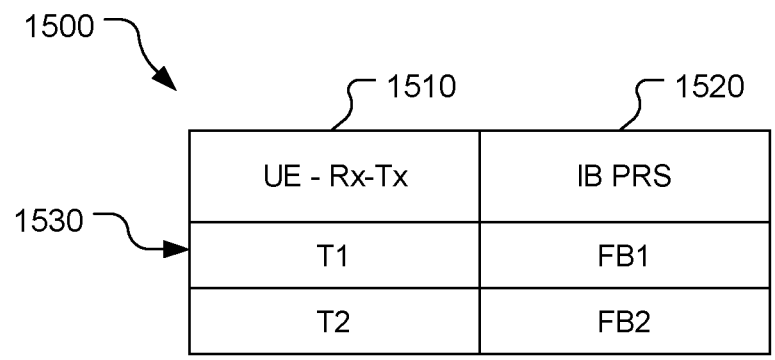
FIG. 15 is a diagram of a measurement report including $UE_{Rx-Tx}$ and IB PRS frequency band.
Figure 16:
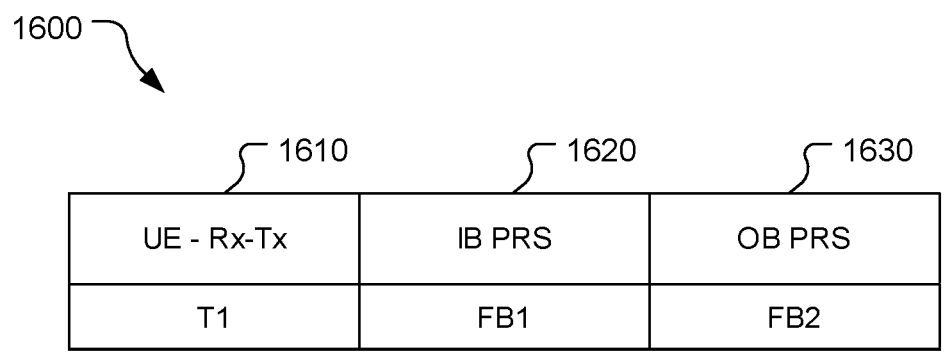
FIG. 16 is a diagram of a measurement report including $UE_{Rx-Tx}$, IB PRS frequency band, and OB PRS frequency band.

Referring also to FIGS. 8-12, the position information reporting unit 570 may be configured to determine the $\text{UE}_{Rx\text{-}Tx}$ time difference based on IB PRS and OB PRS of the same frequency band if such IB PRS and OB PRS are scheduled and otherwise to determine the $\text{UE}_{Rx\text{-}Tx}$ time difference based on IB PRS and OB PRS of different frequency bands. The position information reporting unit 570 may provide an indication of the IB PRS frequency band and/or the OB PRS frequency band. For example, as shown in FIG. 8, OB PRS 810 is scheduled for a first frequency band, OB PRS 820 is scheduled for a second frequency band (different from the first frequency band), IB PRS 830 is scheduled for the first frequency band, and IB PRS 840 is scheduled for the second frequency band. The first frequency band is different than the second frequency band, but may overlap with the second frequency band, i.e., the first and second frequency bands are not identical but may have frequencies in common (i.e., share frequencies). The position information reporting unit 570 may be configured to determine a $\text{UE}_{Rx\text{-}Tx}$ time difference for the IB PRS 830 and the OB PRS 810 and determine a $\text{UE}_{Rx\text{-}Tx}$ time difference for the IB PRS 840 and the OB PRS 820 based on IB PRS and OB PRS being configured in the same bands. Referring also to FIG. 15, the position information reporting unit 570 may send a measurement report 1500 containing a $\text{UE}_{Rx\text{-}Tx}$ time difference field 1510 and a IB PRS field. The $\text{UE}_{Rx\text{-}Tx}$ time difference field 1510 indicates time values of the difference between IB PRS reception and corresponding OB PRS transmission, and the IB PRS field 1520 contains corresponding indications of the IB PRS with which the $\text{UE}_{Rx\text{-}Tx}$ time differences are associated. The indications of the IB PRS may be, e.g., IB PRS IDs (identities) such as an index value, or, as shown in FIG. 15, an indication of the respective frequency band of the IB PRS with which the respective $\text{UE}_{Rx\text{-}Tx}$ time differences are associated. The position information reporting unit 570 may not indicate the OB PRS frequency bands as the bands are implicit. As another example, as shown in FIG. 9, OB PRS 910 is scheduled for a first frequency band, OB PRS 920 is scheduled for a second frequency band, and IB PRS 930 is scheduled for the first frequency band. The position information reporting unit 570 may be configured to determine a $\text{UE}_{Rx\text{-}Tx}$ time difference for the IB PRS 930 and the OB PRS 910 based on IB PRS and OB PRS being configured in the same bands. The position information reporting unit 570 may report (e.g., as with the report 1500) the $\text{UE}_{Rx\text{-}Tx}$ time difference with a corresponding indication of the IB PRS with which the $\text{UE}_{Rx\text{-}Tx}$ time differences are associated, e.g., with an indication of the frequency band with which the $\text{UE}_{Rx\text{-}Tx}$ time difference is associated. The position information reporting unit 570 may not indicate the OB PRS frequency band as this is implicit (with only one IB PRS being scheduled). As another example, as shown in FIG. 10, OB PRS 1010 is scheduled for the second frequency band, and IB PRS 1020 is scheduled for the first frequency band. Referring also to FIG. 16, the position information reporting unit 570 may be configured to determine a $UE_{Rx-Tx}$ time difference for the IB PRS 1020 and the OB PRS 1010 and send a measurement report 1600 with a $UE_{Rx-Tx}$ time difference field 1610, a IB PRS field 1620, and an OB PRS field 1630. The fields 1610, 1620, 1630 include the $UE_{Rx-Tx}$ time difference with corresponding indications of the IB PRS and OB PRS, e.g., indications of the frequency bands of the IB PRS and the OB PRS, with which the $UE_{Rx-Tx}$ time difference is associated. The indications of the frequency bands may, for example, be indexes of the bands (e.g., 10-bit values specifying one of 1024 frequency bands of respective frequencies windows). As another example, as shown in FIG. 11, OB PRS 1110 is scheduled for the second frequency band, OB PRS 1120 is scheduled for a third frequency band (different from the first and second frequency bands), and IB PRS 1130 is scheduled for the first frequency band. The position information reporting unit 570 may be configured to determine a $UE_{Rx-Tx}$ time difference for the IB PRS 1130 and the OB PRS 1110 and/or and a $UE_{Rx-Tx}$ time difference for the IB PRS 1130 and the OB PRS 1120, and report (e.g., similar to the measurement report 1600) the $UE_{Rx-Tx}$ time difference(s) with corresponding indications of the IB PRS and OB PRS, e.g., indications of the frequency bands of the IB PRS and the OB PRS for each $UE_{Rx-Tx}$ time difference. As another example, as shown in FIG. 12, OB PRS 1210 is scheduled for the second frequency band, IB PRS 1220 is scheduled for the first frequency band, and IB PRS 1230 is scheduled for the third frequency band. The position information reporting unit 570 may be configured to determine a $UE_{Rx-Tx}$ time difference for the IB PRS 1230 and the OB PRS 1210 and/or and a $UE_{Rx-Tx}$ time difference for the IB PRS 1230 and the OB PRS 1210, and report (e.g., similar to the report 1600) the $UE_{Rx-Tx}$ time difference(s) with corresponding indications of the IB PRS and OB PRS, e.g., indications of the frequency bands of the IB PRS and the OB PRS for each $UE_{Rx-Tx}$ time difference.

Figure 13:
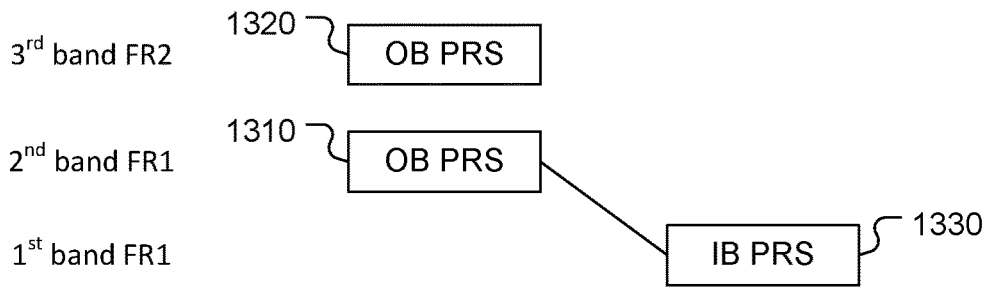
FIG. 13 is a block diagram of scheduled IB PRS in the first frequency band and OB PRS in the second and third frequency bands, with a IB PRS/OB PRS pair in the first frequency band/second frequency band combination used to determine $UE_{Rx-Tx}$.
Figure 14:
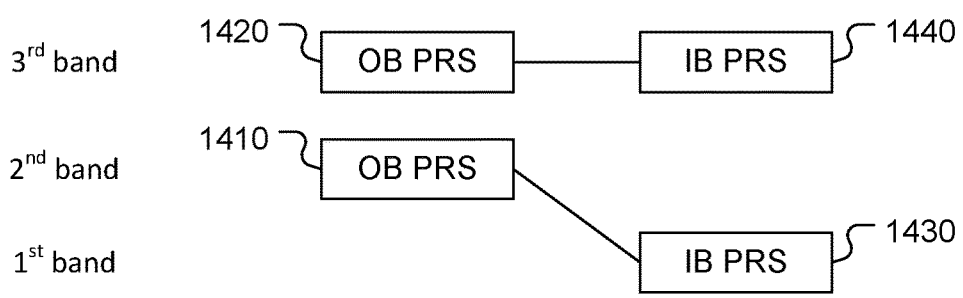
FIG. 14 is a block diagram of scheduled IB PRS in the first and third frequency bands and OB PRS in the second and third frequency bands, with a IB PRS/OB PRS pair in the third frequency band used to determine $UE_{Rx-Tx}$, and a IB PRS/OB PRS pair in the first frequency band/second frequency band combination used to determine $UE_{Rx-Tx}$.
Figure 17:
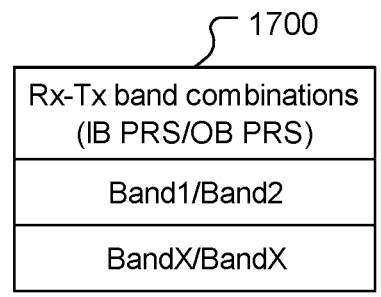
FIG. 17 is a diagram of a capability report indicating combinations of bands to be used for Rx-Tx reporting.

The position information reporting unit 570 may be configured not to report an indication of the OB PRS if the OB PRS is implicit. For example, referring again to FIGS. 8 and 15, the OB PRS frequency band may be implicit due to a protocol known to the UE and to a recipient of the $UE_{Rx-Tx}$ time difference, e.g., that the OB PRS is the same frequency band of the IB PRS (unless otherwise indicated). As another example, referring again to FIG. 10, with the OB PRS 1010 being the only OB PRS scheduled and the IB PRS 1020 being the only IB PRS scheduled, the position information reporting unit 570 may transmit the measurement report 1600 without the OB PRS field 1630 and/or the IB PRS field 1620 because the values of both of these fields are implicit with the knowledge of the PRS schedule for the UE. As another example, referring also to FIG. 13, the OB PRS frequency band may be implicit due to a protocol known to the UE and to a recipient of the $UE_{Rx-Tx}$ time difference, e.g., that with multiple scheduled OB PRS, the OB PRS is the scheduled OB PRS in the same frequency range as the IB PRS for determining and reporting the $UE_{Rx-Tx}$ time difference. That is, the position information reporting unit 570 may be configured to use an OB PRS of the same frequency range as a IB PRS for determining and reporting the $UE_{Rx-Tx}$ time difference. As shown in FIG. 13, an OB PRS 1310 is scheduled in a second frequency band that is in FR1, a OB PRS 1320 is scheduled in a third frequency band that is in FR2, and a IB PRS 1330 is scheduled in a first frequency band that is in FR1. In this case, with the position information reporting unit configured to use the OB PRS of the same frequency range as the IB PRS, an OB PRS for a $UE_{Rx-Tx}$ time difference reported for the IB PRS 1330 is implicitly the OB PRS 1310 (and the IB PRS 1330 may be explicitly indicated or not (if the IB PRS 1330 is the only IB PRS scheduled)). As another example, the OB PRS frequency band may be implicit due to a protocol known to the UE and to a recipient of the $UE_{Rx-Tx}$ time difference, e.g., that with multiple scheduled OB PRS, the OB PRS of the smallest index value, not used for another reported $UE_{Rx-Tx}$ time difference, is used for the IB PRS to determine the $UE_{Rx-Tx}$ time difference. In the example of FIG. 13, the OB PRS 1310 would again be implicit for a $UE_{Rx-Tx}$ time difference reported for the IB PRS 1330 with the protocol being that the position information reporting unit 570 is configured to use the OB PRS with the lowest index value (e.g., of scheduled OB PRS not used for another $UE_{Rx-Tx}$ time difference) for determining and reporting a $UE_{Rx-Tx}$ time difference for a selected IB PRS. As another example, the OB PRS frequency band may be implicit due to a capability report, provided by the capability reporting unit 580, linking OB PRS with respective IB PRS, and the IB PRS being indicated or being the only IB PRS scheduled (at all or for which a $UE_{Rx-Tx}$ time difference is provided without an indication of the IB PRS). The position information reporting unit 570 may be configured to report combinations of bands to be used for Rx-Tx reporting when IB PRS and OB PRS are scheduled in the respective bands. For example, referring also to FIG. 17, OB PRS 1410 is scheduled for the second frequency band, OB PRS 1420 is scheduled for the third frequency band, IB PRS 1430 is scheduled for the first frequency band, and IB PRS 1440 is scheduled for the third frequency band. Referring also to FIG. 17, the capability reporting unit 580 transmits a capability report 1700 indicating combinations of bands to be used for Rx-Tx reporting. In this example, the capability report 1700 indicates that the UE 500 will report $UE_{Rx-Tx}$ time differences for IB PRS in frequency band 1 using OB PRS in frequency band 2, and will generally report $UE_{Rx-Tx}$ time differences for IB PRS using OB PRS in the same frequency band, if scheduled (i.e., the BandX/BandX indication). Thus, for the PRS schedule shown in FIG. 14, the position information reporting unit 570 $UE_{Rx-Tx}$ time differences for the IB PRS 1430 and the OB PRS 1410, and the IB PRS 1440 and the OB PRS 1420.

Band Indexing

When reporting the $UE_{Rx-Tx}$ value, the position information reporting unit 570 may report a frequency band of the OB PRS corresponding to the $UE_{Rx-Tx}$ value, e.g., as part of a TRP ID. The frequency band of the OB PRS can be reported using a band index in a variety of ways. For example, bands may be sequentially numbered, e.g., with 1024 possible bands each being represented by a sequence of 10 bits and the appropriate 10-bit indication of the frequency band of the OB PRS provided in a measurement report, e.g., in the TRP ID. Other techniques may be used to reduce the number of bits, and thus the overhead, for specifying the band used for OB PRS.

Option 1

The capability reporting unit 580 may provide a capability report that includes OB PRS frequency bands that the UE 500 supports and the position information reporting unit 570 may be configured to indicate the OB PRS frequency band by a Relative Band Index that is a value relative to the OB PRS frequency bands indicated in the capability report. For example, the UE 500 may report to the server 400 (e.g., an LMF) what frequency bands that the UE 500 supports for transmitting OB PRS. The UE 500 will typically report that the UE 500 supports fewer than 1024 bands for OB PRS. For example, referring also to FIG. 18, the capability reporting unit 580 may transmit a capability report 1800 that includes a band index field 1810 and a frequency band field 1820. The UE 500 may index the supported bands, e.g., in numerical order from the lowest-supported band to the highest-supported bands, although other techniques for numbering the supported bands may be used. Thus, values of the frequency band field 1820 indicate frequency bands (e.g., of the 1024 bands that may be indicated) supported by the UE 500 (that the UE 500 may use to transmit OB PRS) and values of the band index field 1810 indicate sequential binary values corresponding to the frequency bands, i.e., relative band indexes, the indexes being relative to the supported frequency bands. In the example shown, the UE 500 reports that the UE 500 supports eight bands for OB PRS, and thus a band index of three bits in length is used for the band index field 1810. For example, an entry 1830 indicates that band index value of 000 corresponds to (indicates that the UE 500 supports) Band1, and in this example Band1 is the frequency band 14 of the 1024 frequency bands that may be indicated by a 10-digit band index.

Option 2

The position information reporting unit 570 of the UE 500 may be configured to indicate the OB PRS band by a Relative Band Index that is relative to which bands the UE 500 has been configured to support. The UE 500 may be as an example of a configuration, and the UE 500 may be configured with OB PRS by the serving cell without the UE 500 sending a capability report, such as the report 1800, and may be configured differently than a capability report sent by the UE 500.

3. The server 400 forwards the UE configuration to neighboring cells. In this way, the neighboring cells, with which the UE 500 may exchange positioning reference signals, e.g., for RTT positioning, will know which bands that the UE 500 has been configured to use for OB PRS. The bands that the UE 500 has been configured to support can be indexed, e.g., from lowest frequency to highest frequency (or by some other mechanism).

4. The UE 500 reports position information (e.g., $UE_{Rx-Tx}$ measurements) including the Relative Band Index indicating the number of the configured OB PRS band that the UE 500 used for the OB PRS. For example, if the UE 500 has been configured to support eight bands for OB PRS, then the Relative Band Index may be a sequence of three bits. As another example, if the UE 500 has been configured to support four bands for OB PRS, then the Relative Band Index may be a sequence of two bits. An example configuration of a multi-RTT-measurement reporting is provided below, with the Relative Band Index (nr-MeasuredSRS-bandIndex) being an optional piece of information.

```
NR-Multi-RTT-MeasList-r16 ::= SEQUENCE (SIZE(l..nrMaxTRPs-r16)) OF NR-Multi-RTT-MeasElement-r16
NR-Multi-RTT-MeasElement-r16 ::= SEQUENCE {
        trp-ID-r16                          TRP-ID-r16,
        nr-DL-PRS-ResourceId-r16            NR-DL-PRS-ResourceId-r16
        OPTIONAL,
        nr-DL-PRS-ResourceSetId-r16         NR-DL-PRS-ResourceSetId-r16         OPTIONAL,
        nr-MeasuredSRS-bandIndex            RelativeBandIndex                    OPTIONAL,
        nr-UE-RxTxTimeDiff-r16              INTEGER (FFS)                        OPTIONAL,
        -- FFS on the value range to be decided in RAN4
        nr-AdditionalPathList-r16           NR-AdditionalPathList-r16
        OPTIONAL,
        nr-TimeStamp-r16                    NR-TimeStamp-r16,
        nr-TimingMeasQuality-r16                NR-TimingMeasQuality-r16,
        nr-PRS-RSRP-Result-r16              INTEGER (FFS)                        OPTIONAL,
        -- FFS, value range to be decided in RAN4.
        nr-Multi-RTT-AdditionalMeasurements-r16
                                            NR-Multi-RTT-AdditionalMeasurements-r16
        OPTIONAL,
        ...
}
``` statically configured (during manufacture of the UE 500 according to a design of the UE 500) or dynamically configured (e.g., by receiving instructions (e.g., assistance data) via the transceiver 520 instructing operation of the UE 500, e.g., providing software instructions to be executed and/or instructions as to which of multiple statically-configured operations to perform). For example, following procedure may be followed:

1. The server 400 (e.g., an LMF) request the serving cell, e.g., of the TRP 300, of the UE 500 to configure the UE 500 with OB PRS.
2. The serving cell dynamically configures the UE 500 (e.g., by sending control information to the UE 500) with OB PRS (including the band(s)) to use for OB PRS and reports the configuration to the server 400. The UE 500 may be configured, for example, to support frequency bands as indicated in the capability report 1800 and band indexes as indicated in the capability report 1800. This is an example only and not limiting of the disclosure, and the capability report 1800 is used with trp-ID-r16, nr-DL-PRS-RsourcedId-r16, and nr-DL-PRS-RsourceSetId-r16 together providing enough information that the IB PRS frequency band may be determined. In this example, DL PRS and UL PRS (SRS for positioning) are assumed, but SL PRS may be used instead.

Option 3

As a subset of Option 2, if the UE 500 is configured to support only two bands for OB PRS, then the Relative Band Index may be a single bit. The single bit may indicate whether the OB PRS is in the same band as the PRS or a different band from the PRS, or may indicate whether the OB PRS is in the lower-frequency band or the higher-frequency band of the two bands that the UE 500 is configured to support for OB PRS (e.g., as statically or dynamically configured, or as indicated in a capability report by the UE 500). The bands that the UE 500 is configured to support for OB PRS may be known by static or dynamic configuration or by reporting by the UE 500, and thus the indication that the OB PRS is not in the same band as the IB PRS will mean that the OB PRS is in the other known band.

An example configuration of a multi-RTT-measurement reporting with the UE 500 configured to support two OB PRS bands is provided below, with the Relative Band Index being a Boolean indication of whether a different band is used for IB PRS and OB PRS (differentBandForPR-SAndSRS) and being an optional piece of information.

PRS 1932 in accordance with the DL PRS schedule of the AD 1922, e.g., using a scheduled frequency band, and transmits the DL PRS 1932 at a ToD $t_1$. The UE 500 receives the DL PRS 1932 at a ToA $t_2$ that is later than $t_1$ (although the line for the DL PRS 1932 is horizontal in FIG. 19 and time is on a vertical axis).

```
NR-Multi-RTT-MeasList-r16 ::= SEQUENCE (SIZE(1..nrMaxTRPs-r16)) OF NR-Multi-RTT-MeasElement-r16
NR-Multi-RTT-MeasElement-r16 ::= SEQUENCE {
    trp-ID-r16                     TRP-ID-r16,
    nr-DL-PRS-ResourceId-r16       NR-DL-PRS-ResourceId-r16               OPTIONAL,
    nr-DL-PRS-ResourceSetId-r16    NR-DL-PRS-ResourceSetId-r16            OPTIONAL,
    differentBandForPRSAndSRS      BOOLEAN                                OPTIONAL,
    nr-UE-RxTxTimeDiff-r16         INTEGER (FFS)                          OPTIONAL,
    -- FFS on the value range to be decided in RAN4
    nr-AdditionalPathList-r16      NR-AdditionalPathList-r16              OPTIONAL,
    nr-TimeStamp-r16               NR-TimeStamp-r16,
    nr-TimingMeasQuality-r16       NR-TimingMeasQuality-r16,
    nr-PRS-RSRP-Result-r16         INTEGER (FFS)                          OPTIONAL,
    -- FFS, value range to be decided in RAN4.
    nr-Multi-RTT-AdditionalMeasurements-r16
                                   NR-Multi-RTT-AdditionalMeasurements-r16  OPTIONAL,
    ...
}
``` with trp-ID-r16, nr-DL-PRS-RsourcedId-r16, and nr-DL-PRS-RsourceSetId-r16 together providing enough information that the IB PRS frequency band may be determined. In this example, DL PRS and UL PRS (SRS for positioning) are assumed, but SL PRS may be used instead.

Operation

Figure 19:
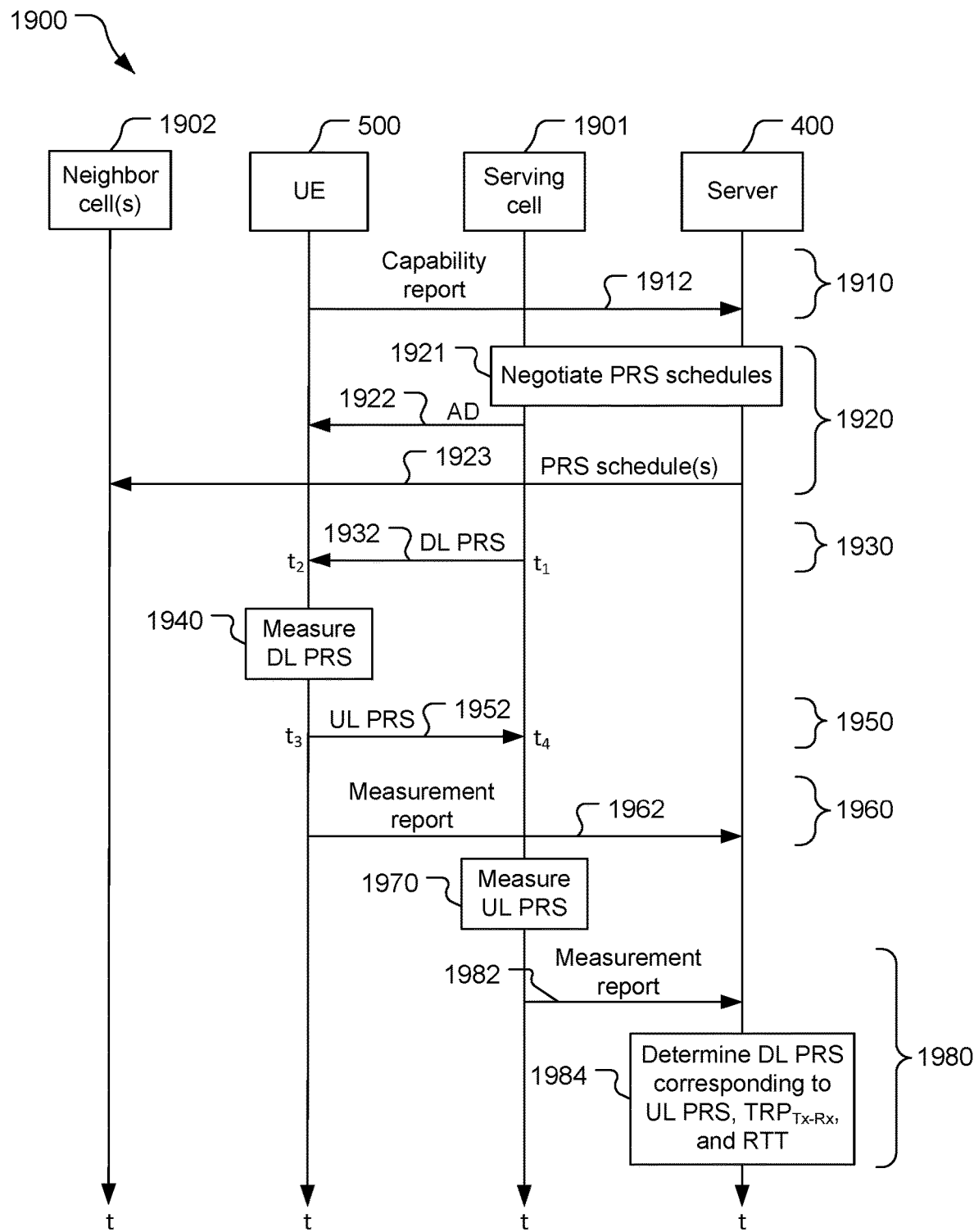
FIG. 19 is a signaling and process flow diagram of a method for determining round-trip time measurements.

Referring to FIG. 19, with further reference to FIGS. 1-18, a signaling and process flow 1900 for determining round-trip time measurements includes the stages shown. The flow 1900 is an example only, as stages may be added, rearranged, and/or removed.

At stage 1910, the UE 500 sends a capability report 1912 to the server 400. The capability report 1912 may indicate, for example, one or more frequency band combinations supported by the UE 500 for measuring IB PRS and OB PRS and reporting one or more corresponding $UE_{Rx-Tx}$ time differences, e.g., as in the capability report 1700. Also or alternatively, the capability report 1912 may indicate multiple frequency bands supported by the UE 500 for transmitting OB PRS, e.g., as in the capability report 1800.

At stage 1920, the server 400 and a serving cell 1901 (of a TRP) negotiate and deliver PRS schedules for the UE 500. At sub-stage 1921, the server 400 and the serving cell 1901 negotiate the PRS resources to allocate to the UE 500 for DL PRS reception and UL PRS transmission (from and to the serving cell 1901 and/or one or more neighbor cells 1902 (of the TRP of the serving cell 1901 and/or another TRP). In this example, inbound PRS are DL PRS and outbound PRS are UL PRS, but the description is applicable to other PRS, e.g., both inbound and outbound PRS being SL PRS, with the PRS being exchanged between the UE 500 and another UE instead of the serving cell 1901. The server 400 and the serving cell 1901 may consider supported frequency bands and/or band combinations indicated by the capability report 1912 in determining the PRS schedules. The serving cell 1901 for the UE 500 transmits AD 1922 (assistance data) to the UE 500, with the AD 1922 including the PRS schedules. The server 400 transmits one or more of the PRS schedules 1923, e.g., the UL PRS schedule, to one or more of the neighbor cells 1902 so that the neighbor cell(s) 1902 is(are) aware of the PRS configuration of the UE 500.

At stage 1930, the serving cell 1901 transmits DL PRS 1932 to the UE 500. The serving cell 1901 transmits the DL At stage 1940, the UE 500 measures the DL PRS 1932. The PRS measurement unit 550 measures the DL PRS 1932 and determines the ToA $t_2$, i.e., the time of arrival of the DL PRS 1932 at the UE 500.

At stage 1950, the UE 500 sends UL PRS 1952 to the serving cell 1901. For example, the PRS transmission unit 560 of the UE 500 sends the UL PRS 1952 in accordance with the UL PRS schedule indicated in the AD 1922. In this example, the UL PRS 1952 are sent by the UE 500 at a time $t_3$ and received by the serving cell 1901 at a time $t_4$ that is later than $t_3$ (although the line for the UL PRS 1952 is horizontal in FIG. 19).

At stage 1960, the UE 500 sends, to the server 400 (possibly via the serving cell 1901), a measurement report 1962 indicative of a $UE_{Rx-Tx}$ time difference between the ToA $t_2$ and the ToD $t_3$. For example, the measurement report 1962, e.g., the measurement report 1500, may indicate a value of the $UE_{Rx-Tx}$ time difference and the DL PRS used to determine the $UE_{Rx-Tx}$ time difference, e.g., if the UL PRS is implicit. As another example, the measurement report 1962, e.g., the measurement report 1600, may indicate a value of the $UE_{Rx-Tx}$ time difference, and the DL PRS and the UL PRS used to determine the $UE_{Rx-Tx}$ time difference. As another example, the measurement report 1962 may include values of the ToA $t_2$ and the ToD $t_3$, from which the value of the $UE_{Rx-Tx}$ time difference can be determined, and the indication(s) of the DL PRS and the UL PRS, as appropriate (e.g., if not implicit).

At stage 1970, the serving cell 1901 measures the UL PRS 1952. For example, the processor 310 measures the UL PRS 1952 and determines a ToA $t_4$, i.e., the time of arrival of the UL PRS 1952 at the serving cell 1901.

At stage 1980, the serving cell 1901 sends a measurement report 1982 to the server 400, and the server 400 determines an RTT between the serving cell 1901 and the UE 500. For example, the serving cell 1901 (e.g., the wireless transmitter 342 and the antenna 346, and/or the wired transmitter 352) sends the measurement report 1982 with values of the ToA $t_4$ and the ToD $t_1$, from which the value of the $Anchor_{Rx-Tx}$ time difference, here a $TRP_{Rx-Tx}$ time difference, can be determined. For a scenario with SL PRS exchanged between the UE 500 and another UE, the $Anchor_{Rx-Tx}$ time difference would be another $UE_{Rx-Tx}$ time difference (for a time difference between transmission of the IB PRS (inbound to the UE 500) and reception of the OB PRS (outbound from the UE 500)). The serving cell 1901 may send one or more other times of arrival of UL PRS and/or other times of departure of DL PRS and the processor 410 of the server 400 may determine the UL PRS 1952 corresponding to the DL PRS 1932 in order to determine the ToA $t_4$ corresponding to the ToD $t_1$ to determine an RTT for the serving cell 1901 and the UE 500, with the RTT being the $TRP_{Rx\text{-}Tx}$ time difference minus the $UE_{Rx\text{-}Tx}$ time difference. At sub-stage 1984, the processor 410 determines that the UL PRS 1952 corresponds to the DL PRS 1932, e.g., based on indications of the UL PRS 1952 and DL PRS 1932 in the measurement report 1962, or based on an indication of the DL PRS 1932 in the measurement report 1962 and knowledge of a protocol implemented by the UE 500 and the PRS schedules from the AD 1922, or based on the PRS schedules alone, or by another means. Based on the association of the DL PRS 1932 and the UL PRS 1952, the processor 410 of the server 400 determines the RTT, e.g., from the ToD $t_1$, the ToA $t_4$ (or the $TRP_{Rx\text{-}Tx}$ time difference) and the $UE_{Rx\text{-}Tx}$ time difference (or the ToA $t_2$ and the ToD $t_3$). The serving cell 1901 may determine that the UL PRS 1952 corresponds to the DL PRS 1932 if the serving cell 1901 has the appropriate information (e.g., the measurement report 1962 and/or knowledge of a UE protocol), with the serving cell 1901 having the AD 1922 (whether used to determine the UL PRS 1952 or not). In this case, the measurement report 1982 may include the value of the $TRP_{Rx\text{-}Tx}$ time difference, or even the RTT. The server 400 (or other entity) may determine a range between the serving cell 1901 and the UE 500 based on the RTT, and may determine a location estimate of the UE 500 based on multiple ranges to the UE 500 from multiple cells of known location (or based on as few as one range from a known location and a known direction of the UE 500 relative to the known location).

Figure 20:
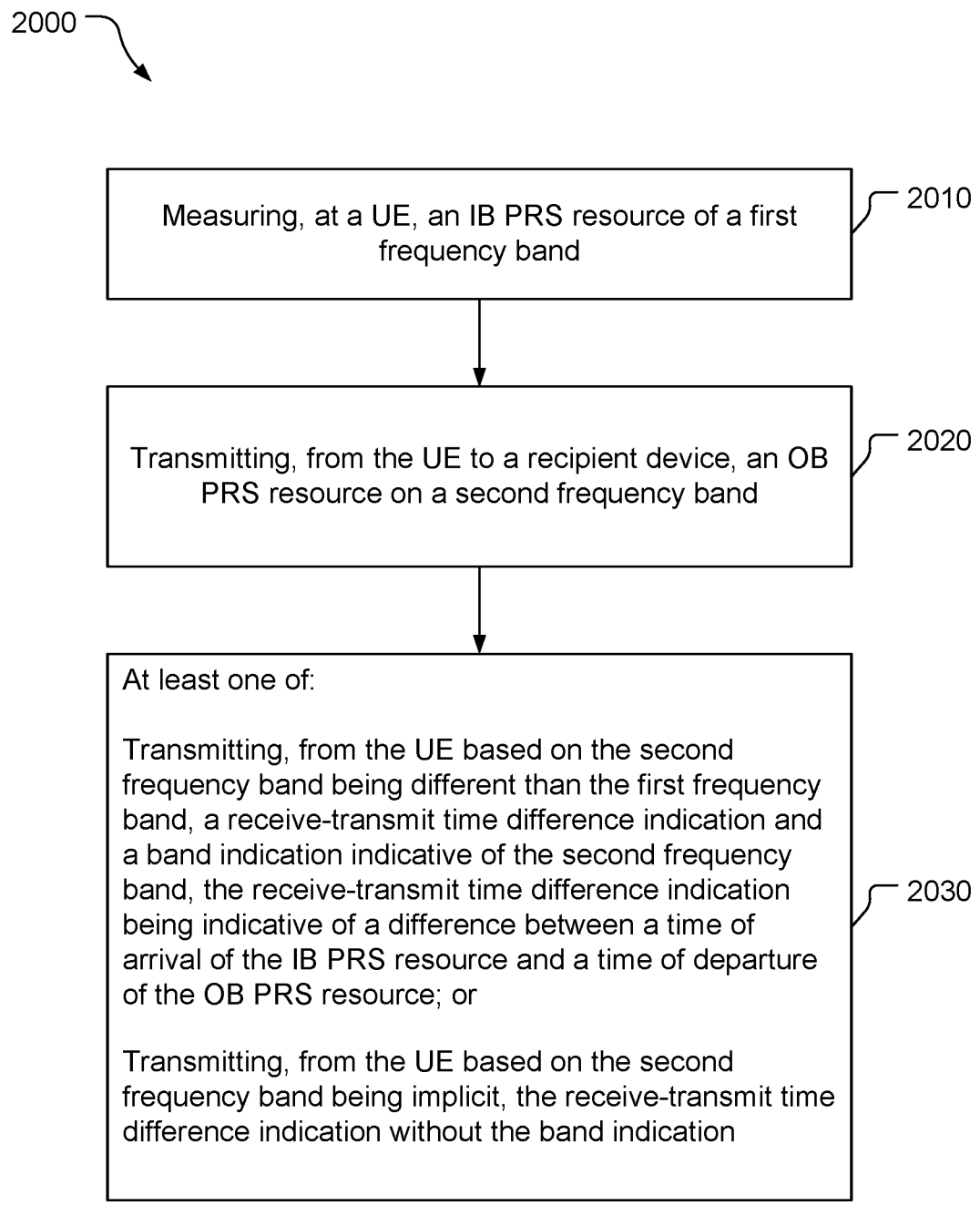
FIG. 20 is a block diagram of a positioning method.

Referring to FIG. 20, with further reference to FIGS. 1-19, a positioning method 2000 includes the stages shown. The method 2000 is, however, an example only and not limiting. The method 2000 may be altered, e.g., by having stages added, removed, rearranged, combined, performed concurrently, and/or having single stages split into multiple stages.

At stage 2010, the method 2000 includes measuring, at a UE, an IB PRS resource of a first frequency band. For example, the PRS measurement unit 550 measures the DL PRS 1932 at stage 1930. As another example, the PRS measurement unit 550 could measure SL PRS received from another UE. The processor 510, possibly in combination with the memory 530, in combination with the transceiver 520 (e.g., the antenna 246 and the wireless receiver 244) may comprise means for measuring the IB PRS resource.

At stage 2020, the method 2000 includes transmitting, from the UE to a recipient device, an OB PRS resource on a second frequency band. For example, the PRS transmission unit 560 transmits the UL PRS 1952 at stage 1950 to the serving cell 1901. As another example, the PRS transmission unit 560 could transmit SL PRS to another UE. The processor 510, possibly in combination with the memory 530, in combination with the transceiver 520 (e.g., the antenna 246 and the wireless transmitter 242) may comprise means for transmitting the OB PRS resource.

At stage 2030, the method 2000 includes at least one of: transmitting, from the UE based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmitting, from the UE based on the second frequency band being implicit, the receive-transmit time difference indication without transmitting the band indication. For example, the position information reporting unit 570 determines and transmits the measurement report 1962 to the server 400 via the serving cell 1901. The measurement report 1962 is indicative of the $UE_{Rx\text{-}Tx}$ time difference (including the $UE_{Rx\text{-}Tx}$ time difference and/or information from which the $UE_{Rx\text{-}Tx}$ time difference may be determined, e.g., the ToA $t_2$ of the DL PRS 1932 and the ToD $t_3$ of the UL PRS 1952 shown in FIG. 19). The position information reporting unit 570 determines and transmits the measurement report 1962 to the server 400 indicating the $UE_{Rx\text{-}Tx}$ time difference (and/or information from which the $UE_{Rx\text{-}Tx}$ time difference may be determined) and the OB PRS frequency band, e.g., as shown in the measurement report 1600, based on the OB PRS frequency band and the IB PRS frequency band being different (with the OB PRS frequency band not being implicit or being implicit). Alternatively, the position information reporting unit 570 determines and transmits the measurement report 1962 without indicating the OB PRS frequency band, e.g., as shown in the measurement report 1500, based on the OB PRS frequency band being implicit. The IB PRS frequency band may also be omitted, e.g., if the IB PRS frequency band is implicit (e.g., the only scheduled IB PRS frequency band). The processor 510, possibly in combination with the memory 530, in combination with the transceiver 520 (e.g., the wireless transmitter 242 and the antenna 246) may comprise means for transmitting the receive-transmit time difference indication and the band indication, and/or may comprise means for transmitting the receive-transmit time difference indication without transmitting the band indication.

Implementations of the method 2000 may include one or more of the following features. In an example implementation, the first frequency band is different from the second frequency band, the method 2000 comprises transmitting a capability report indicating that receive-transmit time difference indications transmitted by the UE corresponding to IB PRS, on the first frequency band, will also correspond to OB PRS on the second frequency band, and the method comprises transmitting the receive-transmit time difference indication without transmitting the band indication based on the second frequency band being indicated in the capability report. For example, the capability reporting unit 580 transmits the capability report 1912 indicating a band combination of frequency band 1 for IB PRS and frequency band 2 for OB PRS, e.g., as in the capability report 1700, indicating that for the IB PRS in frequency band 1, a $UE_{Rx\text{-}Tx}$ time difference will be indicated based on OB PRS in frequency band 2 (as shown in FIG. 10). The position information reporting unit 570 transmits the measurement report 1962 indicative of the $UE_{Rx\text{-}Tx}$ time difference without indicating the OB PRS frequency band, e.g., as shown in an entry 1530 of the measurement report 1500, in view of the indicated relationship between IB PRS frequency band and OB PRS frequency band in the capability report (although the IB PRS frequency band may be indicated, e.g., if not implicit). In another example implementation, the method includes transmitting the receive-transmit time difference indication is transmitted without transmitting the band indication based on the second frequency band being a sole scheduled frequency band for the UE to transmit PRS to the recipient device. For example, UL PRS to be sent to the TRP 300 may be scheduled on a single band or SL PRS to be sent to another UE may be scheduled on a single band.

Also or alternatively, implementations of the method 2000 may include one or more of the following features. In an example implementation, the first frequency band is different from the second frequency band, the OB PRS resource is a first OB PRS resource, and the method comprises transmitting the receive-transmit time difference indication without transmitting the band indication based on the UE selecting, according to a protocol, the first OB PRS resource from among the first OB PRS resource and at least a second OB PRS resource on a third frequency band that is different from the first frequency band and the second frequency band. For example, the processor 510 may be statically or dynamically configured to transmit an indication of the $UE_{Rx-Tx}$ time difference without transmitting an indication of the OB PRS frequency band if a protocol dictates the selection of the OB PRS frequency band and thus the OB PRS frequency band is implicit. In another example implementation, the method 2000 includes selecting the first OB PRS resource based on the second frequency band being in a same frequency range as the first frequency band. For example, as shown in FIG. 13, the position information reporting unit 570 may select the OB PRS 1310 in the same frequency range as (although different frequency band from) the IB PRS 1330 to use for determining and reporting an indication of the $UE_{Rx-Tx}$ time difference. The processor 510, possibly in combination with the memory 530, may comprise means for selecting the first OB PRS resource. In another example implementation, the method 2000 includes selecting the first OB PRS resource based on the second frequency band having a smaller band index than the third frequency band. For example, as shown in FIG. 13, the position information reporting unit 570 may select the OB PRS 1310, due to having a smaller band index than the OB PRS 1320, to use for determining and reporting an indication of the $UE_{Rx-Tx}$ time difference. The processor 510, possibly in combination with the memory 530, may comprise means for selecting the first OB PRS resource.

Also or alternatively, implementations of the method 2000 may include one or more of the following features. In an example implementation, the method comprises transmitting the receive-transmit time difference indication without transmitting the band indication based on the first frequency band and the second frequency band being the same frequency band. For example, the position information reporting unit 570 transmits the measurement report 1962, e.g., the measurement report 1500 corresponding to the PRS schedule shown in FIG. 8 (or just the entry 1530 for the PRS schedule shown in FIG. 9), with indications of the IB PRS frequency bands and with the OB PRS frequency bands implicitly being the same (or the OB PRS frequency band being the same as the IB PRS frequency band). In another example implementation, the method 2000 includes: transmitting a capability report indicating a plurality of possible OB PRS frequency bands; and transmitting the receive-transmit time difference indication and the band indication, associated with the receive-transmit time difference indication, the band indication being a relative band index indicating one of the plurality of possible OB PRS frequency bands indicated in the capability report. For example, the capability reporting unit 580 transmits the capability report 1912 such as the capability report 1800 indicating possible (e.g., supported) OB PRS frequency bands with corresponding index values for only the indicated possible bands, and the position information reporting unit 570 transmits an indication of one of the band indexes 1810 along with an indication of the $UE_{Rx-Tx}$ time difference. The processor 510, possibly in combination with the memory 530, in combination with the transceiver 520 (e.g., the wireless transmitter 242 and the antenna 246) may comprise means for transmitting the capability report.

Also or alternatively, implementations of the method 2000 may include one or more of the following features. In an example implementation, the method further comprises receiving an OB PRS configuration indicating a plurality of possible OB PRS frequency bands; and the method comprises transmitting the receive-transmit time difference indication and the band indication, associated with the receive-transmit time difference indication, the band indication being a relative band index indicating one of the plurality of possible OB PRS frequency bands indicated in the OB PRS configuration. For example, the UE 500 receives a UL PRS configuration in the AD 1922 indicating possible UL PRS frequency bands (e.g., similar to the capability report 1800), and the position information reporting unit 570 transmits an indication of one of the band indexes for the possible UL PRS frequency bands along with an indication of the $UE_{Rx-Tx}$ time difference. The processor 510, possibly in combination with the memory 530, in combination with the transceiver 520 (e.g., the wireless receiver 244 and the antenna 246) may comprise means for receiving the OB PRS configuration. In another example implementation, the band indication is a Boolean indication indicating whether the first frequency band and the second frequency band are the same or different, or indicating which one of two OB PRS frequency bands configured for the UE is the second frequency band.

Implementation Examples

Non-exhaustive implementation examples are provided in the following numbered clauses.

1. A UE (user equipment) comprising:
at least one transceiver;
a memory; and
at least one processor, communicatively coupled to the at least one transceiver and the memory, wherein the at least one processor is:
configured to measure an inbound (IB) positioning reference signal (PRS) resource, on a first frequency band, received via the at least one transceiver;
configured to transmit, via the at least one transceiver to a recipient device, an outbound (OB) PRS resource on a second frequency band; and
at least one of:
configured to transmit, via the at least one transceiver and based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or
configured to transmit, based on the second frequency band being implicit, the receive-transmit time difference indication via the at least one transceiver without the band indication.

2. The UE of clause 1, wherein:
the first frequency band is different from the second frequency band;
the at least one processor is further configured to transmit a capability report indicating that receive-transmit time difference indications transmitted by the UE corresponding to IB PRS, received by the UE on the first frequency band, will also correspond to OB PRS transmitted by the UE on the second frequency band; and the at least one processor is configured to transmit the receive-transmit time difference indication without the band indication based on the second frequency band being indicated in the capability report.

3. The UE of clause 1, wherein the at least one processor is configured to transmit the receive-transmit time difference indication without the band indication based on the second frequency band being a sole scheduled frequency band for the UE to transmit PRS to the recipient device.

4. The UE of clause 1, wherein the first frequency band is different from the second frequency band, the OB PRS resource is a first OB PRS resource, and the at least one processor is configured to transmit the receive-transmit time difference indication without the band indication based on the at least one processor selecting, according to a protocol, the first OB PRS resource from among the first OB PRS resource and at least a second OB PRS resource on a third frequency band that is different from the first frequency band and the second frequency band.

5. The UE of clause 4, wherein the at least one processor is configured to select the first OB PRS resource based on the second frequency band being in a same frequency range as the first frequency band.

6. The UE of clause 4, wherein the at least one processor is configured to select the first OB PRS resource based on the second frequency band having a smaller band index than the third frequency band.

7. The UE of clause 1, wherein the at least one processor is configured to transmit the receive-transmit time difference indication without the band indication based on the first frequency band and the second frequency band being the same frequency band.

8. The UE of clause 1, wherein:

the at least one processor is further configured to transmit a capability report indicating a plurality of possible OB PRS frequency bands; and the at least one processor is configured to transmit the band indication and the receive-transmit time difference indication, the band indication being a relative band index indicating one of the plurality of possible OB PRS frequency bands indicated in the capability report.

9. The UE of clause 1, wherein:

the at least one processor is further configured to receive an OB PRS configuration indicating a plurality of possible OB PRS frequency bands; and the at least one processor is configured to transmit the band indication and the receive-transmit time difference indication, the band indication being a relative band index indicating one of the plurality of possible OB PRS frequency bands indicated in the OB PRS configuration.

10. The UE of clause 9, wherein the band indication is a Boolean indication indicating whether the first frequency band and the second frequency band are the same or different, or indicating which one of two OB PRS frequency bands configured for the UE is the second frequency band.

11. A UE (user equipment) comprising:

means for measuring an inbound (IB) positioning reference signal (PRS) resource on a first frequency band;

means for transmitting, to a recipient device, an outbound (OB) PRS resource on a second frequency band; and at least one of:

means for transmitting, based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or means for transmitting, based on the second frequency band being implicit, the receive-transmit time difference indication without the band indication.

12. The UE of clause 11, wherein:

the first frequency band is different from the second frequency band;

the UE further comprises means for transmitting a capability report indicating that receive-transmit time difference indications transmitted by the UE corresponding to IB PRS, received by the UE on the first frequency band, will also correspond to OB PRS transmitted by the UE on the second frequency band; and the UE comprises the means for transmitting the receive-transmit time difference indication without the band indication which comprise means for transmitting the receive-transmit time difference indication without the band indication based on the second frequency band being indicated in the capability report.

13. The UE of clause 11, wherein the UE comprises the means for transmitting the receive-transmit time difference indication without the band indication which comprise means for transmitting the receive-transmit time difference indication without the band indication based on the second frequency band being a sole scheduled frequency band for the UE to transmit PRS to the recipient device.

14. The UE of clause 11, wherein the first frequency band is different from the second frequency band, the OB PRS resource is a first OB PRS resource, and the UE comprises the means for transmitting the receive-transmit time difference indication without the band indication which comprise means for transmitting the receive-transmit time difference indication without the band indication based on the UE selecting, according to a protocol, the first OB PRS resource from among the first OB PRS resource and at least a second OB PRS resource on a third frequency band that is different from the first frequency band and the second frequency band.

15. The UE of clause 14, further comprising means for selecting the first OB PRS resource based on the second frequency band being in a same frequency range as the first frequency band.

16. The UE of clause 14, further comprising means for selecting the first OB PRS resource based on the second frequency band having a smaller band index than the third frequency band.

17. The UE of clause 11, wherein the UE comprises the means for transmitting the receive-transmit time difference indication without the band indication which comprise means for transmitting the receive-transmit time difference indication without the band indication based on the first frequency band and the second frequency band being the same frequency band.

18. The UE of clause 11, wherein:

the UE further comprises means for transmitting a capability report indicating a plurality of possible OB PRS frequency bands; and the UE comprises the means for transmitting the receive-transmit time difference indication and the band indication which comprise means for transmitting the band indication associated with the receive-transmit time difference indication and with the band indication being a relative band index indicating one of the plurality of possible OB PRS frequency bands indicated in the capability report.

19. The UE of clause 11, wherein:

the UE further comprises means for receiving an OB PRS configuration indicating a plurality of possible OB PRS frequency bands; and the UE comprises the means for transmitting the receive-transmit time difference indication and the band indication which comprise means for transmitting the band indication associated with the receive-transmit time difference indication and with the band indication being a relative band index indicating one of the plurality of possible OB PRS frequency bands indicated in the OB PRS configuration.

20. The UE of clause 19, wherein the band indication is a Boolean indication indicating whether the first frequency band and the second frequency band are the same or different, or indicating which one of two OB PRS frequency bands configured for the UE is the second frequency band.

21. A positioning method comprising:

measuring, at a UE (user equipment), an inbound (IB) positioning reference signal (PRS) resource on a first frequency band;

transmitting, from the UE to a recipient device, an outbound (OB) PRS resource on a second frequency band; and at least one of:

transmitting, from the UE based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmitting, from the UE based on the second frequency band being implicit, the receive-transmit time difference indication without transmitting the band indication.

22. The method of clause 21, wherein:

the first frequency band is different from the second frequency band;

the method further comprises transmitting a capability report indicating that receive-transmit time difference indications transmitted by the UE corresponding to IB PRS, on the first frequency band, will also correspond to OB PRS transmitted by the UE on the second frequency band; and the method comprises transmitting the receive-transmit time difference indication without transmitting the band indication based on the second frequency band being indicated in the capability report.

23. The method of clause 21, wherein the method comprises transmitting the receive-transmit time difference indication without transmitting the band indication based on the second frequency band being a sole scheduled frequency band for the UE to transmit PRS to the recipient device.

24. The method of clause 21, wherein the first frequency band is different from the second frequency band, the OB PRS resource is a first OB PRS resource, and the method comprises transmitting the receive-transmit time difference indication without transmitting the band indication based on the UE selecting, according to a protocol, the first OB PRS resource from among the first OB PRS resource and at least a second OB PRS resource on a third frequency band that is different from the first frequency band and the second frequency band.

25. The method of clause 24, further comprising selecting the first OB PRS resource based on the second frequency band being in a same frequency range as the first frequency band.

26. The method of clause 24, further comprising selecting the first OB PRS resource based on the second frequency band having a smaller band index than the third frequency band.

27. The method of clause 21, wherein the method comprises transmitting the receive-transmit time difference indication without transmitting the band indication based on the first frequency band and the second frequency band being the same frequency band.

28. The method of clause 21, wherein:

the method further comprises transmitting a capability report indicating a plurality of possible OB PRS frequency bands; and the method comprises transmitting the receive-transmit time difference indication and the band indication, associated with the receive-transmit time difference indication, the band indication being a relative band index indicating one of the plurality of possible OB PRS frequency bands indicated in the capability report.

29. The method of clause 21, wherein:

the method further comprises receiving an OB PRS configuration indicating a plurality of possible OB PRS frequency bands; and the method comprises transmitting the receive-transmit time difference indication and the band indication, associated with the receive-transmit time difference indication, the band indication being a relative band index indicating one of the plurality of possible OB PRS frequency bands indicated in the OB PRS configuration.

30. The method of clause 29, wherein the band indication is a Boolean indication indicating whether the first frequency band and the second frequency band are the same or different, or indicating which one of two OB PRS frequency bands configured for the UE is the second frequency band.

31. A non-transitory, processor-readable storage medium comprising processor-readable instructions to cause one or more processors of a UE (user equipment) to:

measure an inbound (TB) positioning reference signal (PRS) resource on a first frequency band;

transmit, to a recipient device, an outbound (OB) PRS resource on a second frequency band; and at least one of:

transmit, based on the second frequency band being different than the first frequency band, a receive-transmit time difference indication and a band indication indicative of the second frequency band, the receive-transmit time difference indication being indicative of a difference between a time of arrival of the IB PRS resource and a time of departure of the OB PRS resource; or transmit, based on the second frequency band being implicit, the receive-transmit time difference indication without the band indication.

32. The storage medium of clause 31, wherein:

the first frequency band is different from the second frequency band;

the storage medium further comprises processor-readable instructions to cause the one or more processors to transmit a capability report indicating that receive-transmit time difference indications transmitted by the UE corresponding to IB PRS, received by the UE on the first frequency band, will also correspond to OB PRS transmitted by the UE on the second frequency band; and the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the second frequency band being indicated in the capability report.

33. The storage medium of clause 31, wherein the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the second frequency band being a sole scheduled frequency band for the UE to transmit PRS to the recipient device.

34. The storage medium of clause 31, wherein the first frequency band is different from the second frequency band, the OB PRS resource is a first OB PRS resource, and the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the one or more processors selecting, according to a protocol, the first OB PRS resource from among the first OB PRS resource and at least a second OB PRS resource on a third frequency band that is different from the first frequency band and the second frequency band.

35. The storage medium of clause 34, further comprising processor-readable instructions to cause the one or more processors to select the first OB PRS resource based on the second frequency band being in a same frequency range as the first frequency band.

36. The storage medium of clause 34, further comprising processor-readable instructions to cause the one or more processors to select the first OB PRS resource based on the second frequency band having a smaller band index than the third frequency band.

37. The storage medium of clause 31, wherein the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the first frequency band and the second frequency band being the same frequency band.

38. The storage medium of clause 31, wherein:
the storage medium further comprises processor-readable instructions to cause the one or more processors to transmit a capability report indicating a plurality of possible OB PRS frequency bands; and
the storage medium comprises the processor-readable instructions to cause the one or more processors to transmit the receive-transmit time difference indication and the band indication, associated with the receive-transmit time difference indication, the band indication being a relative band index indicating one of the plurality of possible OB PRS frequency bands indicated in the capability report.

39. The storage medium of clause 31, wherein:
the storage medium further comprises processor-readable instructions to cause the one or more processors to receive an OB PRS configuration indicating a plurality of possible OB PRS frequency bands; and
the storage medium comprises the processor-readable instructions to cause the one or more processors to transmit the receive-transmit time difference indication and the band indication, associated with the receive-transmit time difference indication, the band indication being a relative band index indicating one of the plurality of possible OB PRS frequency bands indicated in the OB PRS configuration.

40. The storage medium of clause 39, wherein the band indication is a Boolean indication indicating whether the first frequency band and the second frequency band are the same or different, or indicating which one of two OB PRS frequency bands configured for the UE is the second frequency band.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A UE (user equipment) comprising:
   at least one transceiver;
   a memory; and
   at least one processor, communicatively coupled to the at least one transceiver and the memory, wherein the at least one processor is:
      configured to measure an inbound (IB) positioning reference signal (PRS) resource, on a first frequency band, received via the at least one transceiver;
      configured to transmit, via the at least one transceiver to a recipient device, an outbound (OB) PRS resource on a second frequency band; and
      configured to transmit, via the at least one transceiver and based on the second frequency band being different than the first frequency band, a receive-transmit time difference indication and a band indication indicative that the UE uses the second frequency band to transmit the OB PRS, the receive-transmit time difference indication being indicative of a difference between a time of arrival of the IB PRS resource and a time of departure of the OB PRS resource.

2. The UE of claim 1, wherein:
   the at least one processor is further configured to transmit a capability report indicating a plurality of possible OB PRS frequency bands; and
   the at least one processor is configured to transmit the band indication and the receive-transmit time difference indication, the band indication being a relative band index indicating one of the plurality of possible OB PRS frequency bands indicated in the capability report.

3. The UE of claim 1, wherein:
   the at least one processor is further configured to receive an OB PRS configuration indicating a plurality of possible OB PRS frequency bands; and
   the at least one processor is configured to transmit the band indication and the receive-transmit time difference indication, the band indication being a relative band index indicating one of the plurality of possible OB PRS frequency bands indicated in the OB PRS configuration.

4. The UE of claim 3, wherein the band indication is a Boolean indication indicating whether the first frequency band and the second frequency band are the same or different, or indicating which one of two OB PRS frequency bands configured for the UE is the second frequency band.

5. A UE (user equipment) comprising:
at least one transceiver;
a memory; and
at least one processor, communicatively coupled to the at least one transceiver and the memory, wherein the at least one processor is:
configured to measure an inbound (IB) positioning reference signal (PRS) resource, on a first frequency band, received via the at least one transceiver;
configured to transmit, via the at least one transceiver to a recipient device, an outbound (OB) PRS resource on a second frequency band;
configured to transmit, based on the second frequency band being implicit, the receive-transmit time difference indication via the at least one transceiver without the band indication,
and wherein:
the first frequency band is different from the second frequency band;
the at least one processor is further configured to transmit a capability report indicating that receive-transmit time difference indications transmitted by the UE corresponding to IB PRS, received by the UE on the first frequency band, will also correspond to OB PRS transmitted by the UE on the second frequency band; and
the at least one processor is configured to transmit the receive-transmit time difference indication without the band indication based on the second frequency band being indicated in the capability report.

6. A UE (user equipment) comprising:
at least one transceiver;
a memory; and
at least one processor, communicatively coupled to the at least one transceiver and the memory, wherein the at least one processor is:
configured to measure an inbound (IB) positioning reference signal (PRS) resource, on a first frequency band, received via the at least one transceiver;
configured to transmit, via the at least one transceiver to a recipient device, an outbound (OB) PRS resource on a second frequency band; and
configured to transmit, based on the second frequency band being implicit, the receive-transmit time difference indication via the at least one transceiver without the band indication,
wherein the first frequency band is different from the second frequency band, the OB PRS resource is a first OB PRS resource, and the at least one processor is configured to transmit the receive-transmit time difference indication without the band indication based on the at least one processor selecting, according to a protocol, the first OB PRS resource from among the first OB PRS resource and at least a second OB PRS resource on a third frequency band that is different from the first frequency band and the second frequency band.

7. The UE of claim 6, wherein the at least one processor is configured to select the first OB PRS resource based on the second frequency band being in a same frequency range as the first frequency band.

8. The UE of claim 6, wherein the at least one processor is configured to select the first OB PRS resource based on the second frequency band having a smaller band index than the third frequency band.

9. A UE (user equipment) comprising:
means for measuring an inbound (IB) positioning reference signal (PRS) resource on a first frequency band;
means for transmitting, to a recipient device, an outbound (OB) PRS resource on a second frequency band; and
means for transmitting, based on the second frequency band being different than the first frequency band, a receive-transmit time difference indication and a band indication indicative that the UE uses the second frequency band to transmit the OB PRS, the receive-transmit time difference indication being indicative of a difference between a time of arrival of the IB PRS resource and a time of departure of the OB PRS resource.

10. The UE of claim 9, wherein:
the UE further comprises means for transmitting a capability report indicating a plurality of possible OB PRS frequency bands; and
the UE comprises the means for transmitting the receive-transmit time difference indication and the band indication which comprise means for transmitting the band indication associated with the receive-transmit time difference indication and with the band indication being a relative band index indicating one of the plurality of possible OB PRS frequency bands indicated in the capability report.

11. The UE of claim 9, wherein:
the UE further comprises means for receiving an OB PRS configuration indicating a plurality of possible OB PRS frequency bands; and
the UE comprises the means for transmitting the receive-transmit time difference indication and the band indication which comprise means for transmitting the band indication associated with the receive-transmit time difference indication and with the band indication being a relative band index indicating one of the plurality of possible OB PRS frequency bands indicated in the OB PRS configuration.

12. The UE of claim 11, wherein the band indication is a Boolean indication indicating whether the first frequency band and the second frequency band are the same or different, or indicating which one of two OB PRS frequency bands configured for the UE is the second frequency band.

13. A UE (user equipment) comprising:
means for measuring an inbound (IB) positioning reference signal (PRS) resource on a first frequency band;
means for transmitting, to a recipient device, an outbound (OB) PRS resource on a second frequency band; and
means for transmitting, based on the second frequency band being implicit, the receive-transmit time difference indication without the band indication, wherein:
the first frequency band is different from the second frequency band;
the UE further comprises means for transmitting a capability report indicating that receive-transmit time difference indications transmitted by the UE corresponding to IB PRS, received by the UE on the first frequency band, will also correspond to OB PRS transmitted by the UE on the second frequency band; and
the UE comprises the means for transmitting the receive-transmit time difference indication without the band indication which comprise means for transmitting the receive-transmit time difference indication without the band indication based on the second frequency band being indicated in the capability report.

14. A UE (user equipment) comprising:
means for measuring an inbound (IB) positioning reference signal (PRS) resource on a first frequency band;
means for transmitting, to a recipient device, an outbound (OB) PRS resource on a second frequency band; and
means for transmitting, based on the second frequency band being implicit, the receive-transmit time difference indication without the band indication,
wherein the first frequency band is different from the second frequency band, the OB PRS resource is a first OB PRS resource, and the UE comprises the means for transmitting the receive-transmit time difference indication without the band indication which comprise means for transmitting the receive-transmit time difference indication without the band indication based on the UE selecting, according to a protocol, the first OB PRS resource from among the first OB PRS resource and at least a second OB PRS resource on a third frequency band that is different from the first frequency band and the second frequency band.

15. The UE of claim 14, further comprising means for selecting the first OB PRS resource based on the second frequency band being in a same frequency range as the first frequency band.

16. The UE of claim 14, further comprising means for selecting the first OB PRS resource based on the second frequency band having a smaller band index than the third frequency band.

17. A positioning method comprising:
measuring, at a UE (user equipment), an inbound (TB) positioning reference signal (PRS) resource on a first frequency band;
transmitting, from the UE to a recipient device, an outbound (OB) PRS resource on a second frequency band; and
transmitting, from the UE based on the second frequency band being different than the first frequency band, a receive-transmit time difference indication and a band indication indicative that the UE uses the second frequency band to transmit the OB PRS, the receive-transmit time difference indication being indicative of a difference between a time of arrival of the IB PRS resource and a time of departure of the OB PRS resource.

18. The method of claim 17, wherein:
the method further comprises transmitting a capability report indicating a plurality of possible OB PRS frequency bands; and
the method comprises transmitting the receive-transmit time difference indication and the band indication, associated with the receive-transmit time difference indication, the band indication being a relative band index indicating one of the plurality of possible OB PRS frequency bands indicated in the capability report.

19. The method of claim 17, wherein:
the method further comprises receiving an OB PRS configuration indicating a plurality of possible OB PRS frequency bands; and
the method comprises transmitting the receive-transmit time difference indication and the band indication, associated with the receive-transmit time difference indication, the band indication being a relative band index indicating one of the plurality of possible OB PRS frequency bands indicated in the OB PRS configuration.

20. The method of claim 19, wherein the band indication is a Boolean indication indicating whether the first frequency band and the second frequency band are the same or different, or indicating which one of two OB PRS frequency bands configured for the UE is the second frequency band.

21. A positioning method comprising:
measuring, at a UE (user equipment), an inbound (TB) positioning reference signal (PRS) resource on a first frequency band;
transmitting, from the UE to a recipient device, an outbound (OB) PRS resource on a second frequency band; and
transmitting, from the UE based on the second frequency band being implicit, the receive-transmit time difference indication without transmitting the band indication, and wherein:
the first frequency band is different from the second frequency band;
the method further comprises transmitting a capability report indicating that receive-transmit time difference indications transmitted by the UE corresponding to IB PRS, on the first frequency band, will also correspond to OB PRS transmitted by the UE on the second frequency band; and
the method comprises transmitting the receive-transmit time difference indication without transmitting the band indication based on the second frequency band being indicated in the capability report.

22. A positioning method comprising:
measuring, at a UE (user equipment), an inbound (IB) positioning reference signal (PRS) resource on a first frequency band;
transmitting, from the UE to a recipient device, an outbound (OB) PRS resource on a second frequency band; and
transmitting, from the UE based on the second frequency band being implicit, the receive-transmit time difference indication without transmitting the band indication,
wherein the first frequency band is different from the second frequency band, the OB PRS resource is a first OB PRS resource, and the method comprises transmitting the receive-transmit time difference indication without transmitting the band indication based on the UE selecting, according to a protocol, the first OB PRS resource from among the first OB PRS resource and at least a second OB PRS resource on a third frequency band that is different from the first frequency band and the second frequency band.

23. The method of claim 22, further comprising selecting the first OB PRS resource based on the second frequency band being in a same frequency range as the first frequency band.

24. The method of claim 22, further comprising selecting the first OB PRS resource based on the second frequency band having a smaller band index than the third frequency band.

25. A non-transitory, processor-readable storage medium comprising processor-readable instructions to cause one or more processors of a UE (user equipment) to:
measure an inbound (IB) positioning reference signal (PRS) resource on a first frequency band;
transmit, to a recipient device, an outbound (OB) PRS resource on a second frequency band; and
transmit, based on the second frequency band being different than the first frequency band, a receive-transmit time difference indication and a band indication indicative that the UE uses the second frequency band to transmit the OB PRS, the receive-transmit time difference indication being indicative of a difference between a time of arrival of the IB PRS resource and a time of departure of the OB PRS resource.

26. The storage medium of claim 25, wherein:
the storage medium further comprises processor-readable instructions to cause the one or more processors to transmit a capability report indicating a plurality of possible OB PRS frequency bands; and
the storage medium comprises the processor-readable instructions to cause the one or more processors to transmit the receive-transmit time difference indication and the band indication, associated with the receive-transmit time difference indication, the band indication being a relative band index indicating one of the plurality of possible OB PRS frequency bands indicated in the capability report.

27. The storage medium of claim 25, wherein:
the storage medium further comprises processor-readable instructions to cause the one or more processors to receive an OB PRS configuration indicating a plurality of possible OB PRS frequency bands; and
the storage medium comprises the processor-readable instructions to cause the one or more processors to transmit the receive-transmit time difference indication and the band indication, associated with the receive-transmit time difference indication, the band indication being a relative band index indicating one of the plurality of possible OB PRS frequency bands indicated in the OB PRS configuration.

28. The storage medium of claim 27, wherein the band indication is a Boolean indication indicating whether the first frequency band and the second frequency band are the same or different, or indicating which one of two OB PRS frequency bands configured for the UE is the second frequency band.

29. A non-transitory, processor-readable storage medium comprising processor-readable instructions to cause one or more processors of a UE (user equipment) to:
measure an inbound (IB) positioning reference signal (PRS) resource on a first frequency band;
transmit, to a recipient device, an outbound (OB) PRS resource on a second frequency band; and
transmit, based on the second frequency band being implicit, the receive-transmit time difference indication without the band indication, wherein:
the first frequency band is different from the second frequency band;
the storage medium further comprises processor-readable instructions to cause the one or more processors to transmit a capability report indicating that receive-transmit time difference indications transmitted by the UE corresponding to IB PRS, received by the UE on the first frequency band, will also correspond to OB PRS transmitted by the UE on the second frequency band; and
the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the second frequency band being indicated in the capability report.

30. A non-transitory, processor-readable storage medium comprising processor-readable instructions to cause one or more processors of a UE (user equipment) to:
measure an inbound (IB) positioning reference signal (PRS) resource on a first frequency band;
transmit, to a recipient device, an outbound (OB) PRS resource on a second frequency band; and
transmit, based on the second frequency band being implicit, the receive-transmit time difference indication without the band indication,
wherein the first frequency band is different from the second frequency band, the OB PRS resource is a first OB PRS resource, and the storage medium comprises the processor-readable instructions to cause the one or more processors to transmit the receive-transmit time difference indication without the band indication which comprise processor-readable instructions to cause the one or more processors to transmit the receive-transmit time difference indication without the band indication based on the one or more processors selecting, according to a protocol, the first OB PRS resource from among the first OB PRS resource and at least a second OB PRS resource on a third frequency band that is different from the first frequency band and the second frequency band.

31. The storage medium of claim 30, further comprising processor-readable instructions to cause the one or more processors to select the first OB PRS resource based on the second frequency band being in a same frequency range as the first frequency band.

32. The storage medium of claim 30, further comprising processor-readable instructions to cause the one or more processors to select the first OB PRS resource based on the second frequency band having a smaller band index than the third frequency band.

* * * * *